US011956182B2

(12) United States Patent
Zhou et al.

(10) Patent No.: US 11,956,182 B2
(45) Date of Patent: Apr. 9, 2024

(54) TECHNIQUES FOR CONFIGURING DOWNLINK CONTROL INFORMATION FOR MULTI-BEAM FULL-DUPLEX OPERATION

(71) Applicant: QUALCOMM Incorporated, San Diego, CA (US)

(72) Inventors: Yan Zhou, San Diego, CA (US); Tianyang Bai, Somerville, NJ (US); Qian Zhang, Basking Ridge, NJ (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 17/337,941

(22) Filed: Jun. 3, 2021

(65) Prior Publication Data

US 2021/0385056 A1   Dec. 9, 2021

Related U.S. Application Data

(60) Provisional application No. 63/035,543, filed on Jun. 5, 2020.

(51) Int. Cl.
*H04L 5/14* (2006.01)
*H04W 72/1263* (2023.01)
(Continued)

(52) U.S. Cl.
CPC ........... *H04L 5/14* (2013.01); *H04W 72/1263* (2013.01); *H04W 72/23* (2023.01); *H04W 72/044* (2013.01)

(58) Field of Classification Search
CPC .... H04L 5/14; H04W 72/1263; H04W 72/23; H04W 72/044; H04B 7/0695; H04B 7/0404; H04B 7/088
See application file for complete search history.

(56) References Cited

U.S. PATENT DOCUMENTS

2019/0053227 A1 * 2/2019 Huang ............... H04L 25/03006
2019/0254110 A1 * 8/2019 He ....................... H04L 5/0048
(Continued)

FOREIGN PATENT DOCUMENTS

WO         2019195528 A1     10/2019
WO    WO-2020033622 A1 *    2/2020 ........... H04L 1/1854
WO         2020063532 A1      4/2020

OTHER PUBLICATIONS

International Search Report and Written Opinion—PCT/US2021/035966—ISA/EPO—dated Nov. 8, 2021.
(Continued)

*Primary Examiner* — Kodzovi Acolatse
*Assistant Examiner* — Anindita Sen
(74) *Attorney, Agent, or Firm* — Arent Fox Schiff LLP

(57) ABSTRACT

Aspects of the present disclosure provide techniques for configuring multi-beam full-duplex communication that allows a device (e.g., user equipment (UE) or base station) to contemporaneously perform both uplink and downlink communication over the same frequency band. Because of the full duplex communication capability provided by the present disclosure, the NR system may achieve reduced latency and improved spectrum and resource efficiency, thereby accommodating a growing demands for the wireless communication. The full duplex communication capability may be achieved by implementing downlink control information (DCI) format that specifies to the UE the beam assignments for contemporaneous transmission (Tx) and reception (Rx). Particularly, beams may be selected such that the beam(s) assigned for communication are independent and uncorrelated, and therefore provide sufficient beam diversity in order to mitigate the limitations of current systems, including self-interference that has hindered implementation of full duplex communication in current systems.

29 Claims, 8 Drawing Sheets

(51) Int. Cl.
*H04W 72/23* (2023.01)
*H04W 72/044* (2023.01)

(56) References Cited

U.S. PATENT DOCUMENTS

2020/0052753 A1* 2/2020 Raghavan ............ H04B 7/0695
2021/0159966 A1* 5/2021 Xi ........................ H04B 7/088
2021/0184733 A1* 6/2021 Cao ....................... H04W 80/02

OTHER PUBLICATIONS

Partial International Search Report—PCT/US2021/035966—ISA/EPO—dated Sep. 16, 2021.

* cited by examiner

TECHNIQUES FOR CONFIGURING DOWNLINK CONTROL INFORMATION FOR MULTI-BEAM FULL-DUPLEX OPERATION

CROSS-REFERENCE TO RELATED APPLICATION(S)

The present application claims benefit of U.S. Provisional Application No. 63/035,543 entitled "TECHNIQUES FOR CONFIGURING DOWNLINK CONTROL INFORMATION FOR MULTI-BEAM FULL-DUPLEX OPERATION" filed Jun. 5, 2020 which is assigned to the assignee hereof and hereby expressly incorporated by reference herein.

BACKGROUND

The present disclosure relates to wireless communication systems, and more particularly, to techniques for configuring downlink control information (DCI) for multi-beam full-duplex communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

SUMMARY

Aspects of the present disclosure provide techniques for configuring multi-beam full-duplex communication that allows a device (e.g., user equipment (UE) or base station) to contemporaneously perform both uplink and downlink communication over the same frequency band. Because of the full duplex communication capability provided by the present disclosure, the NR system may achieve reduced latency and improved spectrum and resource efficiency, thereby accommodating a growing demands for the wireless communication. The full duplex communication capability may be achieved by implementing downlink control information (DCI) format that specifies to the UE the beam assignments for contemporaneous transmission (Tx) and reception (Rx). Particularly, beams may be selected such that the beam(s) assigned for communication are independent and uncorrelated, and therefore provide sufficient beam diversity in order to assist in mitigating the limitations of current systems, including self-interference that has hindered implementation of full duplex communication in current systems.

In one example, a method for wireless communication is disclosed. The method may include receiving, at a first UE, a DCI transmission to facilitate a multi-beam full-duplex communication. The method may further include decoding the DCI to identify one or more beams from a plurality of candidate beams to be used for the multi-beam full-duplex communication by the first UE. The multi-beam full-duplex communication may comprise the first UE contemporaneously transmitting uplink communication over at least a first beam and receiving downlink communication over at least a second beam on a same frequency band. The method may further include transmitting, during a first time slot, uplink data over a first set of antennas of the UE to a base station or a second UE on at least the first beam identified based on the decoding of the DCI. The method may further include receiving, during a first time slot, downlink data over a second set of antennas of the UE from the base station or the second UE on the at least the second beam identified based on the decoding of the DCI.

In another example, an apparatus for wireless communications. The apparatus may include a memory having instructions and a processor configured to execute the instructions to receive, at a first UE, a DCI transmission to facilitate a multi-beam full-duplex communication. The processor may further be configured to execute the instructions to decode the DCI to identify one or more beams from a plurality of candidate beams to be used for the multi-beam full-duplex communication by the first UE. The multi-beam full-duplex communication may comprise the first UE contemporaneously transmitting uplink communication over at least a first beam and receiving downlink communication over at least a second beam on a same frequency band. The processor may further be configured to execute the instructions to transmit, during a first time slot, uplink data over a first set of antennas of the UE to a base station or a second UE on at least the first beam identified based on the decoding of the DCI. The processor may further be configured to execute the instructions to receive, during a first time slot, downlink data over a second set of antennas of the UE from the base station or the second UE on the at least the second beam identified based on the decoding of the DCI.

In some aspects, a non-transitory computer readable medium includes instructions stored therein that, when executed by a processor, cause the processor to perform the steps of receiving, at a first UE, a DCI transmission to facilitate a multi-beam full-duplex communication. The processor may further execute the instructions for decoding the DCI to identify one or more beams from a plurality of candidate beams to be used for the multi-beam full-duplex communication by the first UE. The multi-beam full-duplex communication may comprise the first UE contemporaneously transmitting uplink communication over at least a first beam and receiving downlink communication over at least a second beam on a same frequency band. The processor may further execute the instructions for transmitting, during a first time slot, uplink data over a first set of antennas of the UE to a base station or a second UE on at least the first beam identified based on the decoding of the DCI. The processor may further execute the instructions for receiving, during a first time slot, downlink data over a second set of antennas of the UE from the base station or the second UE on the at least the second beam identified based on the decoding of the DCI.

In certain aspects, another apparatus for wireless communication is disclosed. The apparatus may include means for receiving, at a first UE, a DCI transmission to facilitate a multi-beam full-duplex communication. The apparatus may further include means for decoding the DCI to identify one or more beams from a plurality of candidate beams to be used for the multi-beam full-duplex communication by the first UE. The multi-beam full-duplex communication may comprise the first UE contemporaneously transmitting uplink communication over at least a first beam and receiving downlink communication over at least a second beam on a same frequency band. The apparatus may further include means for transmitting, during a first time slot, uplink data over a first set of antennas of the UE to a base station or a second UE on at least the first beam identified based on the decoding of the DCI. The apparatus may further include means for receiving, during a first time slot, downlink data over a second set of antennas of the UE from the base station or the second UE on the at least the second beam identified based on the decoding of the DCI.

In another examples, another method for wireless communication is disclosed. The method may include selecting, at a first device, one or more beams from a plurality of candidate beams to be used for the multi-beam full-duplex communication by a second device that is capable of conducting full-duplex communication. The method may further include generating, at the first device, a DCI to include information identifying the one or more beams selected for the second device for multi-beam full-duplex communication, wherein the multi-beam full-duplex communication allows the second device to contemporaneously transmit uplink communication over at least a first beam and receive downlink communication over at least a second beam on a same frequency band based on the DCI that is generated by the first device. The method may also include transmitting the DCI to the second device to configure for multi-beam full-duplex communication.

In another example, an apparatus for wireless communications. The apparatus may include a memory having instructions and a processor configured to the instructions to select, at a first device, one or more beams from a plurality of candidate beams to be used for the multi-beam full-duplex communication by a second device that is capable of conducting full-duplex communication. The processor may further be configured to execute the instructions to generate, at the first device, a DCI to include information identifying the one or more beams selected for the second device for multi-beam full-duplex communication, wherein the multi-beam full-duplex communication allows the second device to contemporaneously transmit uplink communication over at least a first beam and receive downlink communication over at least a second beam on a same frequency band based on the DCI that is generated by the first device. The processor may further be configured to execute the instructions to transmit the DCI to the second device to configure for multi-beam full-duplex communication.

In some aspects, a non-transitory computer readable medium includes instructions stored therein that, when executed by a processor, cause the processor to perform the steps of selecting, at a first device, one or more beams from a plurality of candidate beams to be used for the multi-beam full-duplex communication by a second device that is capable of conducting full-duplex communication. The processor may further execute the instructions for generating, at the first device, a DCI to include information identifying the one or more beams selected for the second device for multi-beam full-duplex communication, wherein the multi-beam full-duplex communication allows the second device to contemporaneously transmit uplink communication over at least a first beam and receive downlink communication over at least a second beam on a same frequency band based on the DCI that is generated by the first device. The processor may further execute the instructions for transmitting the DCI to the second device to configure for multi-beam full-duplex communication In certain aspects, another apparatus for wireless communication is disclosed. The apparatus may include means for selecting, at a first device, one or more beams from a plurality of candidate beams to be used for the multi-beam full-duplex communication by a second device that is capable of conducting full-duplex communication. The apparatus may further include means for generating, at the first device, a DCI to include information identifying the one or more beams selected for the second device for multi-beam full-duplex communication, wherein the multi-beam full-duplex communication allows the second device to contemporaneously transmit uplink communication over at least a first beam and receive downlink communication over at least a second beam on a same frequency band based on the DCI that is generated by the first device. The apparatus may further include means for transmitting the DCI to the second device to configure for multi-beam full-duplex communication To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
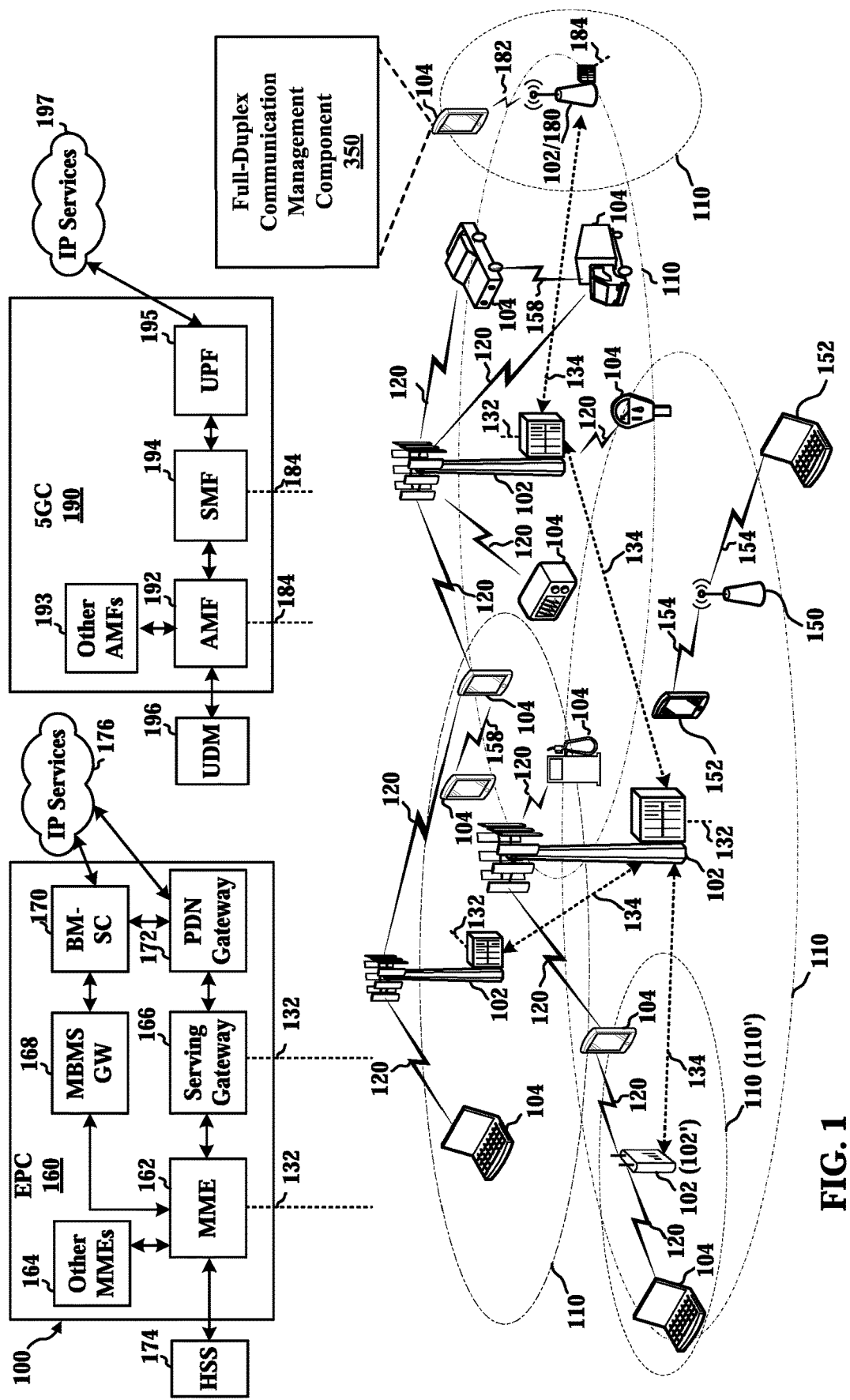
FIG. 1 is a schematic diagram of an example of a wireless communications system in accordance with aspects of the present disclosure.

In recent years, with the introduction of a myriad of smart handheld devices, user demands for mobile broadband has dramatically increased. For example, the drastic growth of bandwidth-hungry applications such as video streaming and multimedia file sharing are pushing the limits of current cellular systems. To address this growing demand, one aspect of the 5G NR communications technology includes the use of high-frequency spectrum bands above 24 GHz, which may be referred to as millimeter wave (mmW) band. The use of these bands enables extremely high data rates and significant increases in data processing capacity compared to prior wireless systems (e.g., LTE, 3G, etc.). However, mmW bands are susceptible to rapid channel variations and suffer from free-space path loss and atmospheric absorption. In addition, mmW bands are highly vulnerable to blockage (e.g. hand, head, body, foliage, building penetration). Particularly, at mmW frequencies, even small variations in the environment, such as the turn of the head, movement of the hand, or a passing car, can change the channel conditions between the base station and the UE, and thus impact communication performance.

Current mmW 5G NR systems leverage the small wavelengths of mmW at the higher frequencies to make use of multiple input multiple output (MIMO) antenna arrays to create highly directional beams that focus transmitted radio frequency (RF) energy in order to attempt to overcome the propagation and path loss challenges in both the uplink and downlink links. Even so, such systems use half-duplex communication that utilize time and/or frequency division for bi-directional communication. Current systems, however, have been unable to feasibly implement full-duplex communication to date due to limitations such as self-interference that may result from attempting to contemporaneously transmit and receive communication on the same frequency band. Generally, self-interference at a device (e.g., base station or UE) may result from a transmitted signal on a first set of antennas of the device leaking to the receiver port for a second set of antennas. Additionally, other limitations in achieving the theoretical full-duplex gain, include but are not limited to residual self-interference, traffic constraints, and inter-cell and intra-cell interference.

Aspects of the present disclosure solve the above-identified problem by providing techniques for configuring multi-beam full-duplex communication that allows a device (e.g., UE or base station) to contemporaneously perform both uplink and downlink communication over the same frequency band. Multi-beam full-duplex communication may refer to instances where the UE may receive downlink communication from a first base station on a first set of mmW beams while contemporaneously transmitting uplink traffic to a second base station on a second set of mmW beams. In other instances, multi-beam full-duplex communication may include a base station transmitting downlink traffic to a first UE on a first set of mmW beams while contemporaneously receiving uplink traffic from a second UE on a second set of mmW beams. Additionally, the multi-beam full-duplex communication instance may be a UE transmitting uplink traffic to a base station on a first set of mmW beams while contemporaneously receiving downlink traffic from the base station on a second set of mmW on the same frequency band (or symbol/slot).

The full duplex communication capability may be achieved by implementing a DCI format that specifies to the UE the beam assignments for contemporaneous Tx and Rx communication. For instance, beams for uplink and downlink communication may be selected such that the beam(s) assigned for each communication are independent and uncorrelated, and therefore provide sufficient beam diversity in order to mitigate (e.g., reduce) the limitations of current systems, including self-interference. The DCI may also determine whether the device may be configured for full-duplex capability. In full duplex operation, a DCI format may be required to be specified for supporting various multi-beam full-duplex operations. Therefore, in some aspects, techniques of the present disclosure provide benefits of including multiple DCI formats for implementing multi-beam full-duplex operation.

In order to determine whether the device is capable for performing full-duplex communication (and whether the full-duplex communication may be enabled), the wireless device may conduct self-interference measurements (SIM). For example, the wireless device (e.g., UE) may transmit a signal from a first set of antennas on one or more Tx beam directions and measure the received (Rxed) signal that is reflected or leaked from the Tx signal on a second set of antennas on one or more Rx beam directions. In some aspects, the first and second set of antennas may be the same or different. Based on the SIM conducted by the wireless device, the base station (or a second UE in sidelink communication) may assign one or more Tx beams and Rx beams that the UE may utilize for concurrent uplink and downlink full-duplex communication.

The assignment of the Tx and Rx beams (alternatively referred to as uplink and downlink beams) from a plurality of candidate beams may be signaled to the UE via DCI from a base station or another UE in case of sidelink communication. For example, each uplink and downlink beam may be indicated by individual downlink or uplink by transmission configuration indication (TCI) state identification (ID). Cases where multiple TCIs or beams are chosen may be referred to as multi-TCI or multi-beam operation, and this type of operation may be used to increase reliability as the use of multiple TCIs or beams improves robustness and resilience to blocking. In some aspects, the TCI states may group one or more mmW beams based on correlation information to ensure reliability and robustness in multi-TCI or multi-beam operations.

In other examples, the assignment of Tx and Rx beams from a plurality of candidate beams may be signaled to the UE via a single TCI codepoint that is included in the DCI. Particularly, a combination of downlink TCI state(s) and uplink TCI state(s) may be mapped to a single TCI codepoint which is transmitted to the UE in the DCI. Based on the TCI codepoint information included in the DCI, the UE may decode the DCI and identify one or more Tx and Rx beams from a plurality of candidate beams to be used for the multi-beam full-duplex communication by the UE. Additionally or alternatively, the downlink TCI state(s) may be mapped to a single downlink TCI codepoint, while uplink TCI state(s) may separately be mapped to a single uplink TCI codepoint. Both the downlink TCI codepoint and the uplink TCI codepoint information may be signaled to the UE in the DCI. Based on the decoding of the DCI and corresponding uplink and downlink TCI codepoints, the UE may determine the one or more Tx and Rx beams to be used for the multi-beam full-duplex communication.

In some examples, the base station (or second UE for sidelink communication) may utilize the DCI for cross carrier scheduling of multi-beam full duplex communication. For example, a DCI may schedule transmission on multiple component carriers (CCs), where the scheduling DCI is sent from a first CC (e.g., Pcell) while the communication may be scheduled on a second CC (e.g., Scell) for downlink communication, uplink communication, or contemporaneous downlink and uplink multi-beam full-duplex communication. The indication of the beam assignments for multi-beam full-duplex communication may be communicated to the UE via one or more techniques identified above with respect to the DCI (e.g., each downlink/uplink beam is indicated by TCI state ID, a single TCI codepoint, or a separate uplink TCI codepoint and downlink TCI codepoint).

In some aspects, a semi-persistent scheduling (SPS) and configured grant (CG) may be activated and deactivated based on the DCI that identifies the specific Tx and Rx beams to use for multi-beam full duplex communication. In some examples, the at least one SPS & CG configurations may have same period with partially/fully overlapped transmission occasions at least in time and/or frequency. The DCI may also activate or deactivate the SPS for cross carriers by transmitting the DCI on a first CC while scheduling the SPS for a second CC.

Additionally or alternatively, the DCI may include scheduling information related to time-division multiplexed (TDMed) repetitions of traffic that is communicated repeatedly over multiple transmission occasions. In some instances, the TDMed repetitions may be across a plurality of slots or mini-slots. Each repetition over a plurality of slots (or mini-slots) can include scheduling of either downlink traffic, uplink traffic, or contemporaneous downlink and uplink full-duplex communication, which can be same or different across repetitions. In some instances, a single DCI may indicate the downlink beam(s), uplink beam(s), or simultaneous downlink beam(s) and uplink beam(s) for each repetition transmission. The indication of the beam assignments for multi-beam full-duplex communication may again be signaled via one or more techniques identified above with respect to the DCI (e.g., each downlink/uplink beam is indicated by TCI state ID, a single TCI codepoint, or a separate uplink TCI codepoint and downlink TCI codepoint).

In some instances, the UE may be in sleep mode. As such, the base station and/or second UE may transmit a wakeup signal (WUS) to transition the UE from sleep mode to active mode. In some examples, the DCI associated with the multi-beam full-duplex communication may be included in the WUS and indicate whether a subsequent discontinuous reception (DRX) ON duration is to be used for downlink communication, uplink communication, or a full-duplex uplink and downlink contemporaneous communication. The DCI included in the WUS may also identify the one or more Tx and/or Rx beams from the plurality of candidate beams to be used for the subsequent DRX ON duration for the full-duplex uplink and downlink contemporaneous communication based on decoding the DCI.

Additionally or alternatively, aspects of the present disclosure also provide techniques for enabling multi-beam full-duplex communication for sidelink communications between a plurality of UEs (e.g., first UE and second UE) without the involvement of the base station. In such instances, the DCI may schedule full-duplex communication between two UEs in sidelink via a two stage DCI. In one example, during a first stage DCI, only one of the two UEs in sidelink communication may transmit a "stage-1" DCI with preliminary scheduling information to schedule a full-duplex transmission of physical sidelink shared channel (PSSCH) in both directions (e.g., uplink and downlink) for the subsequent second stage ("stage-2"). As such, during a second stage, each of the two UEs in the sidelink communication may transmit a stage-2 DCI in PSSCH to provide remaining (or complete) scheduling information for the UEs to decode data in PSSCH.

In other examples for sidelink communication, each UE may transmit a stage-1 DCI with preliminary scheduling information to schedule PSSCH from the UE to be expected in second stage. In some examples, the first and second "stage-1" DCIs transmitted from the first UE and the second UE to each other may be TDMed or contemporaneously transmitted using full-duplex communication. In each instance, the preliminary scheduling information that is included in stage-1 DCI may include PSSCH time/frequency resource assignment, modulation and coding scheme (MCS), MNRS pattern or port number, beta offset, priority, or stage-2 DCI format. Additionally, the remaining scheduling information that is transmitted during the second stage may include PSSCH hybrid automatic repeat request (HARQ) ID, new data indicator (NDI), RV, channel state information (CSI) request, or source/destination node ID.

In some aspects, DCI in PSCCH for sidelink communication may also be transmitted contemporaneously from two UEs. In such instance, there may be search spaces configured between the two UEs to decode the DCI. To this end, in some examples, two separate search spaces may be configured for two UEs to send their corresponding PSCCH simultaneously, and each search s pace may have its own CORESET configuration (e.g. time/frequency allocation, beam, and search space configuration such as aggregation levels, candidate DCI number per aggregation level, etc.) In other examples, a single search space may be configured for two UEs to send their respective PSCCH contemporaneously. In such instance, the joint search space may have CORSET configuration and search space configuration for each of the two directions (e.g., uplink and downlink).

Various aspects are now described in more detail with reference to the FIGS. 1-4. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem and full-duplex communication management component 350 for facilitating multi-beam full duplex communication, in accordance with aspects described herein. And while the figures show the UE 104 has implementing the full-duplex communication component 350, it should be appreciated that the full duplex capability (or alternatively flexible time division duplex (TDD) capability) may be implemented by either one or more UE 104 and/or the gNB 180 (see e.g., DCI Generation Component 550 in FIG. 5). Thus, while this is one illustrative example, substantially any node or type of node may include a modem and full-duplex communication component 350 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, the full-duplex communication component 350 can receive a DCI transmission to facilitate a multi-beam full-duplex communication. The full-duplex communication component 350 may also decode the DCI to identify one or more beams from a plurality of candidate beams to be used for the multi-beam full-duplex communication by the first UE. In some examples, the multi-beam full-duplex communication may include the first UE contemporaneously transmitting uplink communication over at least a first beam and receiving downlink communication over at least a second beam on a same frequency band. Further, the full-duplex communication component 350 may transmit, during a first time slot, uplink data over a first set of antennas of the UE to a base station or a second UE on at least the first beam identified based on the decoding of the DCI. The full-duplex communication component 350 may also receive, during a first time slot, downlink data over a second set of antennas of the UE from the base station or the second UE on the at least the second beam identified based on the decoding of the DCI.

Similarly, one or more base stations (e.g., gNBs 102) or UEs 104 (e.g., for sidelink communication) may generate a DCI in accordance with aspects of the present disclosure and signal the full-duplex capabilities and beam assignments for uplink and downlink concurrent communication on the same frequency band.

FIGS. 2A-2D illustrates a schematic diagrams of multiple use cases of multi-beam full-duplex communication in accordance with aspects of the present disclosure. Particularly, aspects of the present disclosure provide techniques for configuring multi-beam full-duplex communication that allows a device (e.g., UE 104 or gNB 102) to contemporaneously perform both uplink and downlink communication over the same frequency band.

Figure 2A:
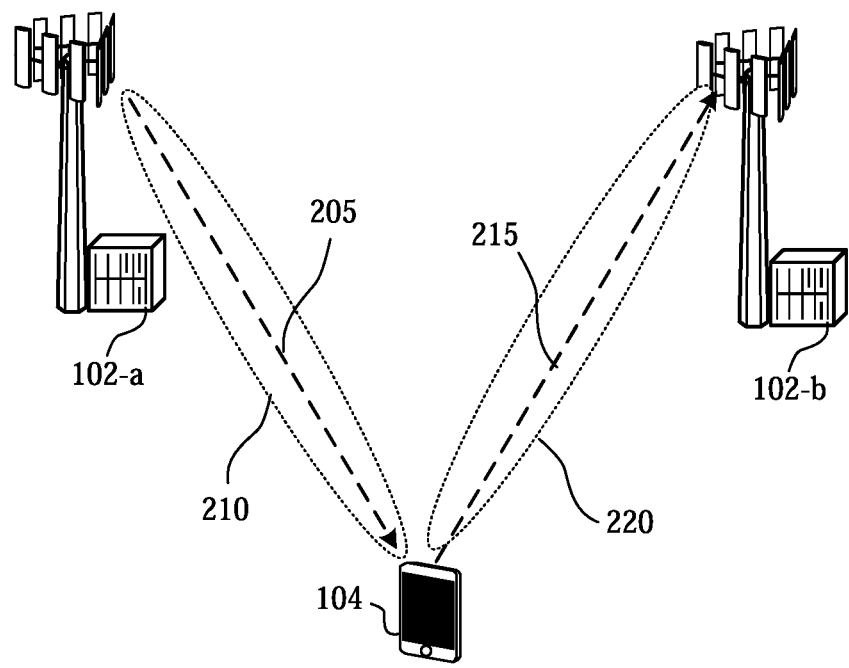
FIGS. 2A-2D is a schematic diagram of an example of a wireless communication system implementing multi-beam full-duplex communication in accordance with aspects of the present disclosure.
Figure 2B:
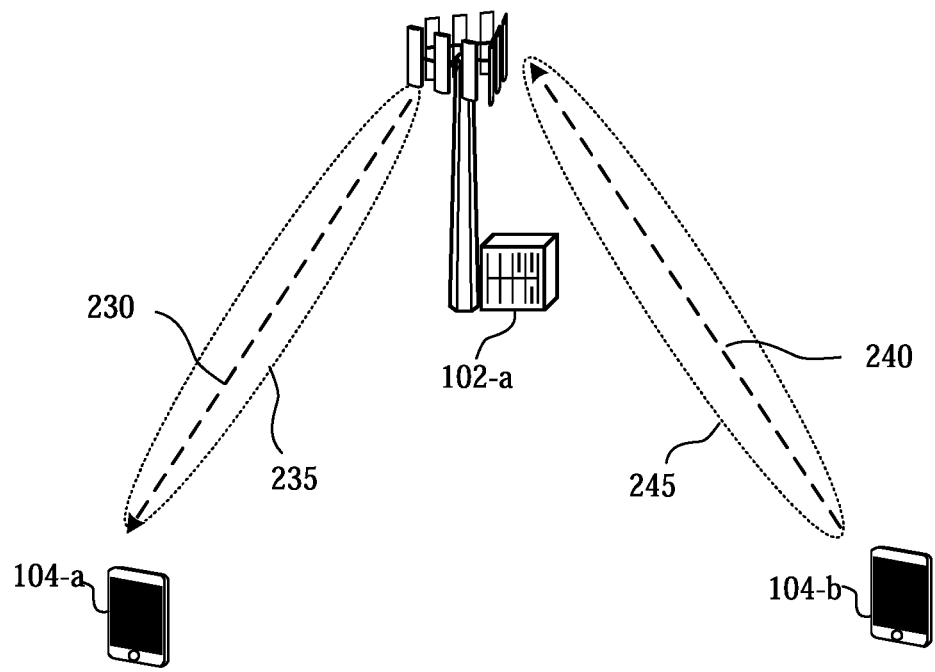
Figure 2C:
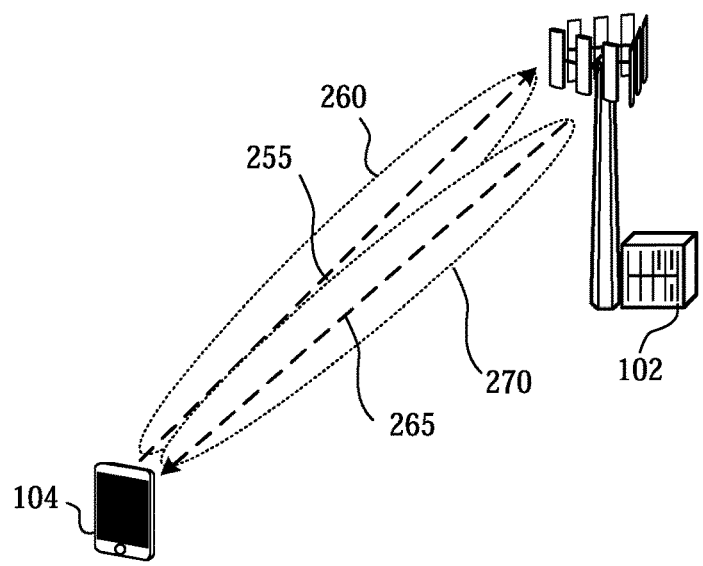
Figure 2D:
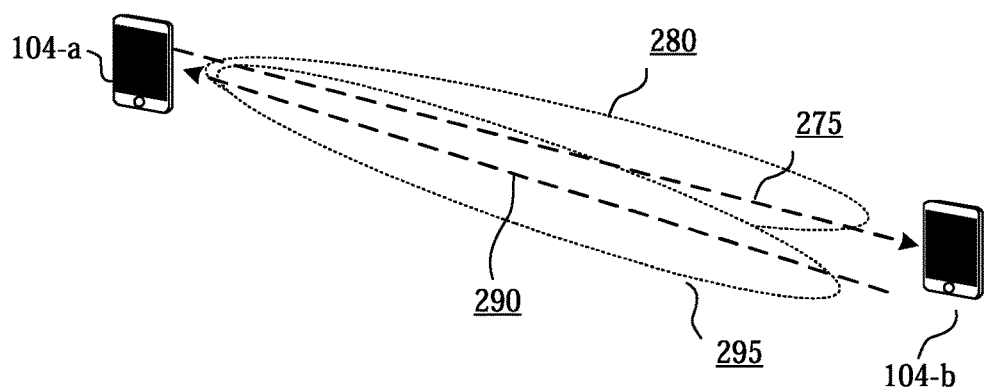

As discussed above, multi-beam full-duplex communication may refer to instances where, as illustrated in FIG. 2A, the UE 104 may receive downlink communication 205 from a first base station 102-a on a first set of mmW beams 210 while contemporaneously transmitting uplink traffic 215 to a second base station 102-b on a second set of mmW beams 220. In other instances, as illustrated in FIG. 2B, multi-beam full-duplex communication may include a base station 102-a transmitting downlink traffic 230 to a first UE 104-a on a first set of mmW beams 235 while contemporaneously receiving uplink traffic 240 from a second UE 104-b on a second set of mmW beams 245. Additionally, as illustrated in FIG. 2C, the multi-beam full-duplex communication instance may be a UE 104 transmitting uplink traffic 255 to a base station 102 on a first set of mmW beams 260 while contemporaneously receiving downlink traffic 265 from the base station 102 on a second set of mmW 270 on the same frequency band (or symbol/slot). The multi-beam full-duplex communication may also include sidelink communication, as illustrated in FIG. 2D, whereby a first UE 104-a may transmit uplink traffic 275 to a second UE 104-b over a first set of mmW Beams 280, while contemporaneously receiving downlink traffic 290 from a second UE 104-b on a second set of mmW beams 295.

In each of these instances, the full-duplex capability and beam assignment may be signaled to the UE (e.g., first UE 104-a) via a DCI transmitted from a base station 102 or another UE (e.g., second UE 104-b in case of sidelink communication). For example, each downlink and uplink beam(s) (e.g., first set of mmW beam 210 for downlink communication and second set of mmW beam 220 for uplink communication in FIG. 2A) may be indicated by individual downlink or uplink by TCI state ID. In some aspects, the TCI states may group one or more mmW beams based on correlation information to ensure reliability and robustness in multi-TCI or multi-beam operations.

In other examples, the assignment of Tx and Rx beams from a plurality of candidate beams may be signaled to the UE 104 via a single TCI codepoint that is included in the DCI. Particularly, a combination of downlink TCI state(s) and uplink TCI state(s) may be mapped to a single TCI codepoint which is transmitted to the UE in the DCI. Based on the TCI codepoint information included in the DCI, the UE 104 may decode the DCI and identify one or more Tx and Rx beams from a plurality of candidate beams to be used for the multi-beam full-duplex communication by the UE 104. Additionally or alternatively, the downlink TCI state(s) may be mapped to a single downlink TCI codepoint, while uplink TCI state(s) may separately be mapped to a single uplink TCI codepoint. Both the downlink TCI codepoint and the uplink TCI codepoint information may be signaled to the UE in the DCI. Based on the decoding of the DCI and corresponding uplink and downlink TCI codepoints, the UE may determine the one or more Tx and Rx beams to be used for the multi-beam full-duplex communication.

Figure 3:
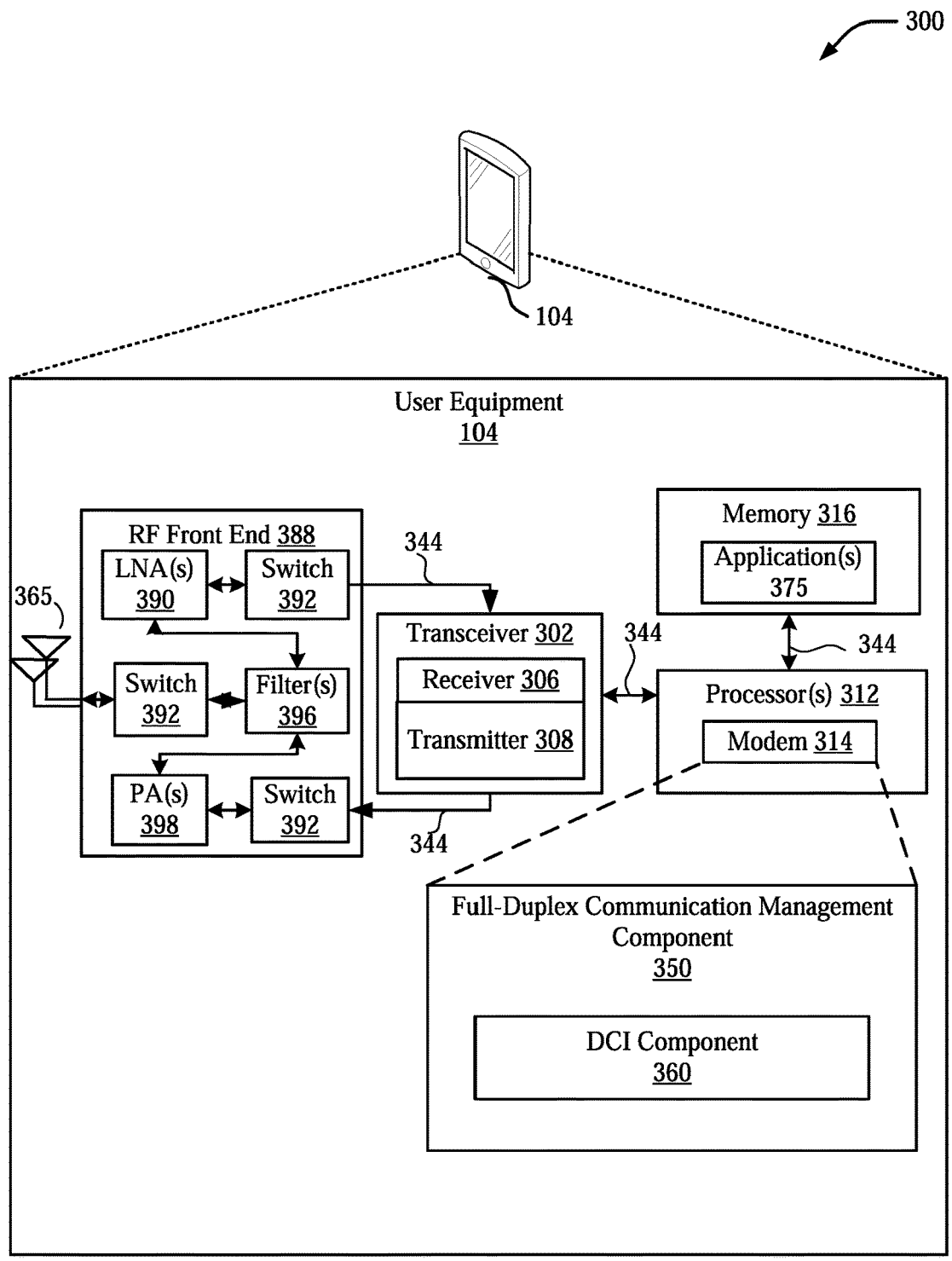
FIG. 3 is a schematic diagram of an example implementation of various components of a user equipment in accordance with various aspects of the present disclosure.

FIG. 3 illustrates a hardware components and subcomponents of a device that may be a UE 104 for implementing one or more methods (e.g., method 400) described herein in accordance with various aspects of the present disclosure. For example, one example of an implementation of the UE 104 may include a variety of components, some of which have already been described above, but including components such as one or more processors 312, memory 316 and transceiver 302 in communication via one or more buses 344, which may operate in conjunction with the full-duplex communication management component 350 to perform functions described herein related to including one or more methods (e.g., 400) of the present disclosure.

In some aspects, the full-duplex communication component 350 can receive a DCI transmission to facilitate a multi-beam full-duplex communication, and decode, via a DCI component 360, the DCI to identify one or more beams from a plurality of candidate beams to be used for the multi-beam full-duplex communication by the first UE, wherein the multi-beam full-duplex communication comprises the first UE contemporaneously transmitting uplink communication over at least a first beam and receiving downlink communication over at least a second beam on a same frequency band. Further, the full-duplex communication component 350 may transmit, during a first time slot, uplink data over a first set of antennas of the UE to a base station or a second UE on at least the first beam identified based on the decoding of the DCI. The full-duplex communication component 350 may also receive, during a first time slot, downlink data over a second set of antennas of the UE from the base station or the second UE on the at least the second beam identified based on the decoding of the DCI.

The one or more processors 312, modem 314, memory 316, transceiver 302, RF front end 388 and one or more antennas 365, may be configured to support voice and/or data calls (simultaneously or non-simultaneously) in one or more radio access technologies. In an aspect, the one or more processors 312 can include a modem 314 that uses one or more modem processors. The various functions related to full-duplex communication management component 350 may be included in modem 314 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 314 associated with communication management component 350 may be performed by transceiver 302.

The memory 316 may be configured to store data used herein and/or local versions of application(s) 375 or full-duplex communication management component 350 and/or one or more of its subcomponents being executed by at least one processor 312. The memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining full-duplex communication management component 350 and/or one or more of its subcomponents, and/or data associated therewith, when the UE 104 is operating at least one processor 312 to execute full-duplex communication management component 350 and/or one or more of its subcomponents.

The transceiver 302 may include at least one receiver 306 and at least one transmitter 308. The receiver 306 may include hardware, firmware, and/or software code executable by a processor for receiving data, the code comprising instructions and being stored in a memory (e.g., computer-readable medium). The receiver 306 may be, for example, a radio frequency (RF) receiver. In an aspect, the receiver 306 may receive signals transmitted by at least one UE 104. Additionally, receiver 306 may process such received signals, and also may obtain measurements of the signals, such as, but not limited to, Ec/Io, SNR, RSRP, RSSI, etc. The transmitter 308 may include hardware, firmware, and/or software code executable by a processor for transmitting data, the code comprising instructions and being stored in a memory (e.g., computer-readable medium). A suitable example of the transmitter 308 may including, but is not limited to, an RF transmitter.

Moreover, in an aspect, transmitting device may include the RF front end 388, which may operate in communication with one or more antennas 365 and transceiver 302 for receiving and transmitting radio transmissions, for example, wireless communications transmitted by at least one base station 102 or wireless transmissions transmitted by UE 104. The RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, the LNA 390 can amplify a received signal at a desired output level. In an aspect, each LNA 390 may have a specified minimum and maximum gain values. In an aspect, the RF front end 388 may use one or more switches 392 to select a particular LNA 390 and its specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and its specified gain value based on a desired gain value for a particular application.

Also, for example, one or more filters 396 can be used by the RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, the RF front end 388 can use one or more switches 392 to select a transmit or receive path using a specified filter 396, LNA 390, and/or PA 398, based on a configuration as specified by the transceiver 302 and/or processor 312.

As such, the transceiver 302 may be configured to transmit and receive wireless signals through one or more antennas 365 via the RF front end 388. In an aspect, the transceiver 302 may be tuned to operate at specified frequencies such that transmitting device can communicate with, for example, one or more base stations 102 or one or more cells associated with one or more base stations 102. In an aspect, for example, the modem 314 can configure the transceiver 302 to operate at a specified frequency and power level based on the configuration of the transmitting device and the communication protocol used by the modem 314.

In an aspect, the modem 314 can be a multiband-multimode modem, which can process digital data and communicate with the transceiver 302 such that the digital data is sent and received using the transceiver 302. In an aspect, the modem 314 can be multiband and be configured to support multiple frequency bands for a specific communications protocol. In an aspect, the modem 314 can be multimode and be configured to support multiple operating networks and communications protocols. In an aspect, the modem 314 can control one or more components of transmitting device (e.g., RF front end 388, transceiver 302) to enable transmission and/or reception of signals from the network based on a specified modem configuration. In an aspect, the modem configuration can be based on the mode of the modem 314 and the frequency band in use. In another aspect, the modem configuration can be based on UE configuration information associated with transmitting device as provided by the network during cell selection and/or cell reselection.

Figure 4:
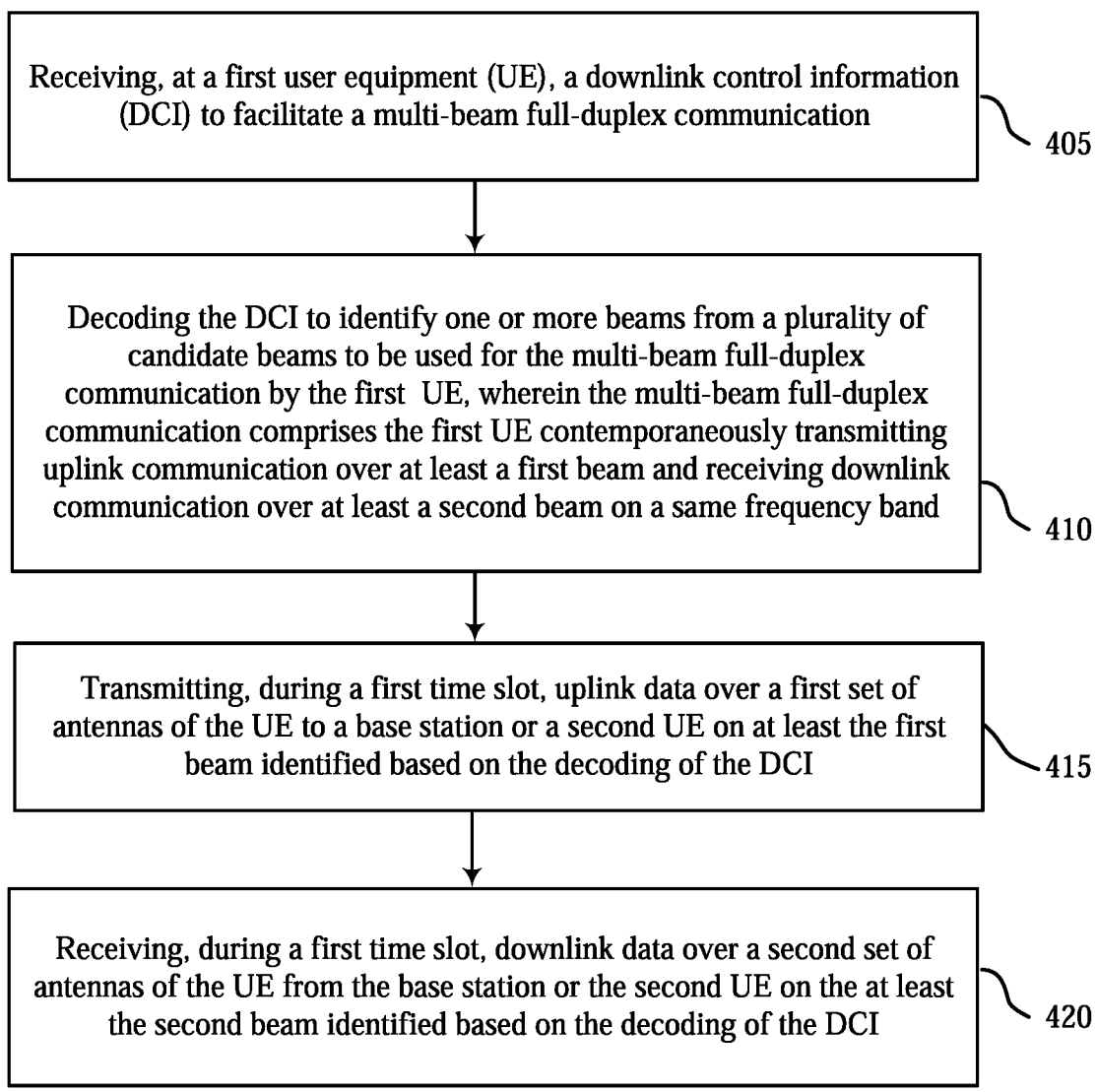
FIG. 4 is a flow diagram of an example of a method of wireless communication implemented by the UE in accordance with aspects of the present disclosure.

Referring to FIG. 4, an example method 400 for wireless communications in accordance with aspects of the present disclosure may be performed by one or more UEs 104 discussed with reference to FIGS. 1 and 2. Although the method 400 is described below with respect to the elements of the UE 104, other components may be used to implement one or more of the steps described herein.

At block 405, the method 400 may include receiving, at a first UE, a DCI transmission to facilitate a multi-beam full-duplex communication. In some examples, the method may include receiving, at the first UE, the DCI transmission from a first component carrier to facilitate the multi-beam full-duplex communication for the first UE on a second component carrier. The method may also include activating, via the DCI received at the UE, at least one SPS configuration and at least one CG for the first UE. In some examples, the DCI may further identify the at least the first beam for uplink communication and at least the second beam for downlink communication that the first UE is configured to use for periodic communication using the multi-beam full-duplex communication with the base station or the second UE. The method may also include deactivating, via the DCI received at the first UE, the at least one SPS configuration and the at least one configured grant CG for the first UE.

In some aspects, activating the at least one SPS configuration and the at least one CG for the first UE may include receiving, at the first UE, the DCI transmission from a first component carrier to facilitate the multi-beam full-duplex communication for the first UE on a second component carrier, and activating, via the DCI received from the first component carrier, the at least one SPS configuration and the at least one configured grant CG for the first UE on a second component carrier.

In other examples, receiving the DCI transmission to facilitate a multi-beam full-duplex communication may include receiving, at the first UE, a first stage-1 DCI from the second UE over sidelink communication during a first time period, wherein the first stage-1 DCI includes a preliminary scheduling information to schedule full-duplex communication for uplink and downlink sidelink communication. The method may also include receiving, at the first UE, a second stage-2 DCI from the second UE over the sidelink communication during a second time period. The method may further include transmitting, from the first UE to the second UE, a third stage-2 DCI over the sidelink communication during the second time period, wherein the second stage-2 DCI and the third stage-2 DCI provide complete scheduling information to decode data in a PSSCH.

In other examples, receiving the DCI transmission to facilitate a multi-beam full-duplex communication may include receiving, at the first UE, a first stage-1 DCI from the second UE over sidelink communication during a first time period, and transmitting, from the first UE to the second UE, a second stage-1 DCI over the sidelink communication during the first time period, wherein the first DCI and the second DCI include a preliminary scheduling information to schedule full-duplex communication for uplink and downlink sidelink communication. The method may also include receiving, at the first UE, a third stage-2 DCI from the second UE over the sidelink communication during a second time period. The method may further include transmitting, from the first UE to the second UE, a fourth stage-2 DCI over the sidelink communication during the second time period, wherein the third stage-2 DCI and the fourth stage-2 DCI provide complete scheduling information to decode data in a PSSCH.

In some instances, the UE may configure two separate search spaces for each of the first UE and the second UE to contemporaneously transmit and receive data over the PSSCH. In other examples, the UE may configure a single separate search space for each of the first UE and the second UE to contemporaneously transmit and receive data over the PSSCH.

Furthermore, the first set of antennas and the second set of antennas of the UE may be same or different. Aspects of block 405 may be performed by the transceiver 302 that receives the communication from either a gNB 102 or another UE 104 over one or more antennas 365 as described with reference to FIG. 3. Thus, the transceiver 302, full-duplex communication management component 350, modem 314, processor 312, and/or the UE 104 or one of its subcomponents may define the means for receiving, at a first UE, a DCI transmission to facilitate a multi-beam full-duplex communication.

At block 410, the method 400 may include decoding the DCI to identify one or more beams from a plurality of candidate beams to be used for the multi-beam full-duplex communication by the first UE, wherein the multi-beam full-duplex communication comprises the first UE contemporaneously transmitting uplink communication over at least a first beam and receiving downlink communication over at least a second beam on a same frequency band. In some examples, decoding the DCI may include identifying a TCI state ID included in the DCI, wherein the TCI state ID indicates each uplink and downlink beam that the first UE is configured to use for the multi-beam full-duplex communication with the base station or the second UE.

In other examples, decoding the DCI may include identifying a TCI codepoint included in the DCI, and determining one or both of downlink TCI state and uplink TCI state that is mapped to the TCI codepoint in order to identify at least the first beam for uplink communication and at least the second beam for downlink communication that the first UE is configured to use for the multi-beam full-duplex communication with the base station or the second UE. In further examples, decoding the DCI may include identifying a first TCI codepoint included in the DCI that is mapped to a downlink TCI state, and identifying a second TCI codepoint included in the DCI that is mapped to an uplink TCI state. The method may also include determining the one or more beams from the plurality of candidate beams to be used for the multi-beam full-duplex communication by the first UE based on the first TCI codepoint and the second TCI codepoint.

In some aspects, decoding the DCI may include determining that the DCI includes information about repeated communication for a plurality of time slots, wherein each slot within the plurality of time slots is configured for downlink communication, uplink communication, or full-duplex uplink and downlink contemporaneous communication. The method may also include identifying the one or more beams from the plurality of candidate beams to be used for the repeated communication during the plurality of time slots for the downlink communication, the uplink communication, or the full-duplex uplink and downlink contemporaneous communication.

Additionally or alternatively, decoding the DCI may include receiving, at the first UE, a WUS from the base station in order to wake-up the first UE from a sleep mode, wherein the WUS includes the DCI. The method may include decoding the DCI to determine whether an operation during a subsequent discontinuous reception (DRX) ON duration is for downlink communication, uplink communication, or a full-duplex uplink and downlink contemporaneous communication, and identifying the one or more beams from the plurality of candidate beams to be used for the subsequent DRX ON duration for the full-duplex uplink and downlink contemporaneous communication based on decoding the DCI.

Aspects of block 410 may be performed by the full-duplex communication management component 350 and the DCI component 360 as described with reference to FIG. 3. Thus, full-duplex communication management component 350, DCI component 360, modem 314, processor 312, and/or the UE 104 or one of its subcomponents may define the means for decoding the DCI to identify one or more beams from a plurality of candidate beams to be used for the multi-beam full-duplex communication by the first UE.

At block 415, the method 400 may include transmitting, during a first time slot, uplink data over a first set of antennas of the UE to a base station or a second UE on at least the first beam identified based on the decoding of the DCI. Aspects of block 415 may be performed by the transceiver 302 that transmits packets generated by the full-duplex communication management component 350 and the modem 314 to either a gNB 102 or another UE 104 over one or more antennas 365 as described with reference to FIG. 3. Thus, the transceiver 302, full-duplex communication management component 350, modem 314, processor 312, and/or the UE 104 or one of its subcomponents may define the means for transmitting, during a first time slot, uplink data over a first set of antennas of the UE to a base station or a second UE on at least the first beam identified based on the decoding of the DCI.

At block 420, the method 400 may include receiving, during a first time slot, downlink data over a second set of antennas of the UE from the base station or the second UE on the at least the second beam identified based on the decoding of the DCI. Aspects of block 420 may be performed by the transceiver 302 that receives packets from either the gNB 102 or another UE 104 at one or more antennas 365 that may be same or different from the set of antennas that transmit uplink packets. The packets that received by the transceiver 302 may be forwarded to the full-duplex communication management component 350 and the modem 314 as described with reference to FIG. 3. Thus, the transceiver 302, full-duplex communication management component 350, modem 314, processor 312, and/or the UE 104 or one of its subcomponents may define the means for receiving, during a first time slot, downlink data over a second set of antennas of the UE from the base station or the second UE on the at least the second beam identified based on the decoding of the DCI.

Figure 5:
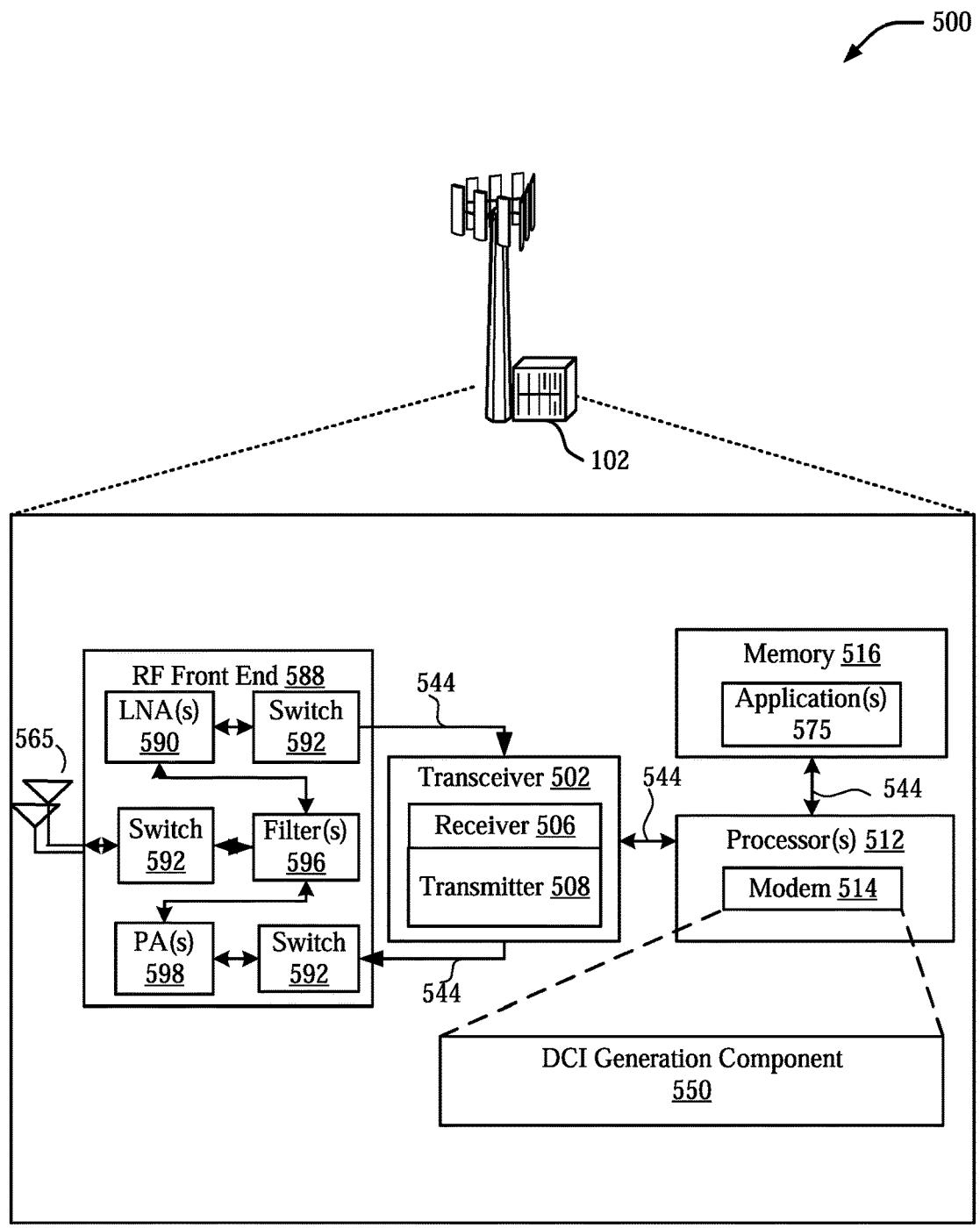
FIG. 5 is a schematic diagram of an example implementation of various components of a base station in accordance with various aspects of the present disclosure.

FIG. 5 illustrates a hardware components and subcomponents of a device that may be a base station 102 for implementing one or more methods (e.g., method 500) described herein in accordance with various aspects of the present disclosure. And while the base station 102 is illustrated as generating the DCI, it should be appreciated that in sidelink communication, a UE 104 may also operate the functionalities of a base station 102 to facilitate full-duplex communication in accordance with aspects of the present disclosure. For example, one example of an implementation of the base station 102 may include a variety of components, some of which have already been described above, but including components such as one or more processors 512, memory 516 and transceiver 502 in communication via one or more buses 544, which may operate in conjunction with the DCI generation component 550 to perform functions described herein related to including one or more methods (e.g., 600) of the present disclosure. It should also be appreciated that the base station 102 and/or UE 104 may have also include the DCI component 360 and perform associated functionalities described herein.

The one or more processors 512, modem 514, memory 516, transceiver 502, RF front end 588 and one or more antennas 565, may be configured to support voice and/or data calls (simultaneously or non-simultaneously) in one or more radio access technologies. In an aspect, the one or more processors 512 can include a modem 314 that uses one or more modem processors. The various functions related to DCI generation component 550 may be included in modem 514 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 514 associated with DCI generation component 550 may be performed by transceiver 502.

The memory 516 may be configured to store data used herein and/or local versions of application(s) 575 DCI generation component 550 and/or one or more of its subcomponents being executed by at least one processor 312. The memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, the memory 516 may be a non-transitory computer-readable storage medium that stores one or more computer-executable codes defining DCI generation component 550 and/or one or more of its subcomponents, and/or data associated therewith, when the base station 102 is operating at least one processor 512 to execute DCI generation component 550 and/or one or more of its subcomponents.

The transceiver 502 may include at least one receiver 506 and at least one transmitter 508. The receiver 506 may include hardware, firmware, and/or software code executable by a processor for receiving data, the code comprising instructions and being stored in a memory (e.g., computer-readable medium). The receiver 506 may be, for example, a radio frequency (RF) receiver. In an aspect, the receiver 506 may receive signals transmitted by at least one UE 104. Additionally, receiver 506 may process such received signals, and also may obtain measurements of the signals, such as, but not limited to, Ec/Io, SNR, RSRP, RSSI, etc. The transmitter 508 may include hardware, firmware, and/or software code executable by a processor for transmitting data, the code comprising instructions and being stored in a memory (e.g., computer-readable medium). A suitable example of the transmitter 508 may including, but is not limited to, an RF transmitter.

Moreover, in an aspect, transmitting device may include the RF front end 588, which may operate in communication with one or more antennas 565 and transceiver 502 for receiving and transmitting radio transmissions, for example, wireless communications transmitted by at least one base station 102 or wireless transmissions transmitted by UE 104. The RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, the LNA 590 can amplify a received signal at a desired output level. In an aspect, each LNA 590 may have a specified minimum and maximum gain values. In an aspect, the RF front end 588 may use one or more switches 592 to select a particular LNA 590 and its specified gain value based on a desired gain value for a particular application.

Further, for example, one or more PA(s) 598 may be used by the RF front end 588 to amplify a signal for an RF output at a desired output power level. In an aspect, each PA 598 may have specified minimum and maximum gain values. In an aspect, the RF front end 588 may use one or more switches 592 to select a particular PA 598 and its specified gain value based on a desired gain value for a particular application.

Also, for example, one or more filters 596 can be used by the RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, the RF front end 388 can use one or more switches 592 to select a transmit or receive path using a specified filter 596, LNA 590, and/or PA 598, based on a configuration as specified by the transceiver 502 and/or processor 512.

As such, the transceiver 502 may be configured to transmit and receive wireless signals through one or more antennas 565 via the RF front end 588. In an aspect, the transceiver 502 may be tuned to operate at specified frequencies such that transmitting device can communicate with, for example, one or more UEs 104 or one or more cells associated with one or more base stations 102. In an aspect, for example, the modem 514 can configure the transceiver 502 to operate at a specified frequency and power level based on the configuration of the transmitting device and the communication protocol used by the modem 514.

In an aspect, the modem 514 can be a multiband-multimode modem, which can process digital data and communicate with the transceiver 502 such that the digital data is sent and received using the transceiver 502. In an aspect, the modem 514 can be multiband and be configured to support multiple frequency bands for a specific communications protocol. In an aspect, the modem 514 can be multimode and be configured to support multiple operating networks and communications protocols. In an aspect, the modem 514 can control one or more components of transmitting device (e.g., RF front end 588, transceiver 502) to enable transmission and/or reception of signals from the network based on a specified modem configuration. In an aspect, the modem configuration can be based on the mode of the modem 514 and the frequency band in use. In another aspect, the modem configuration can be based on UE configuration information associated with transmitting device as provided by the network during cell selection and/or cell reselection.

Figure 6:
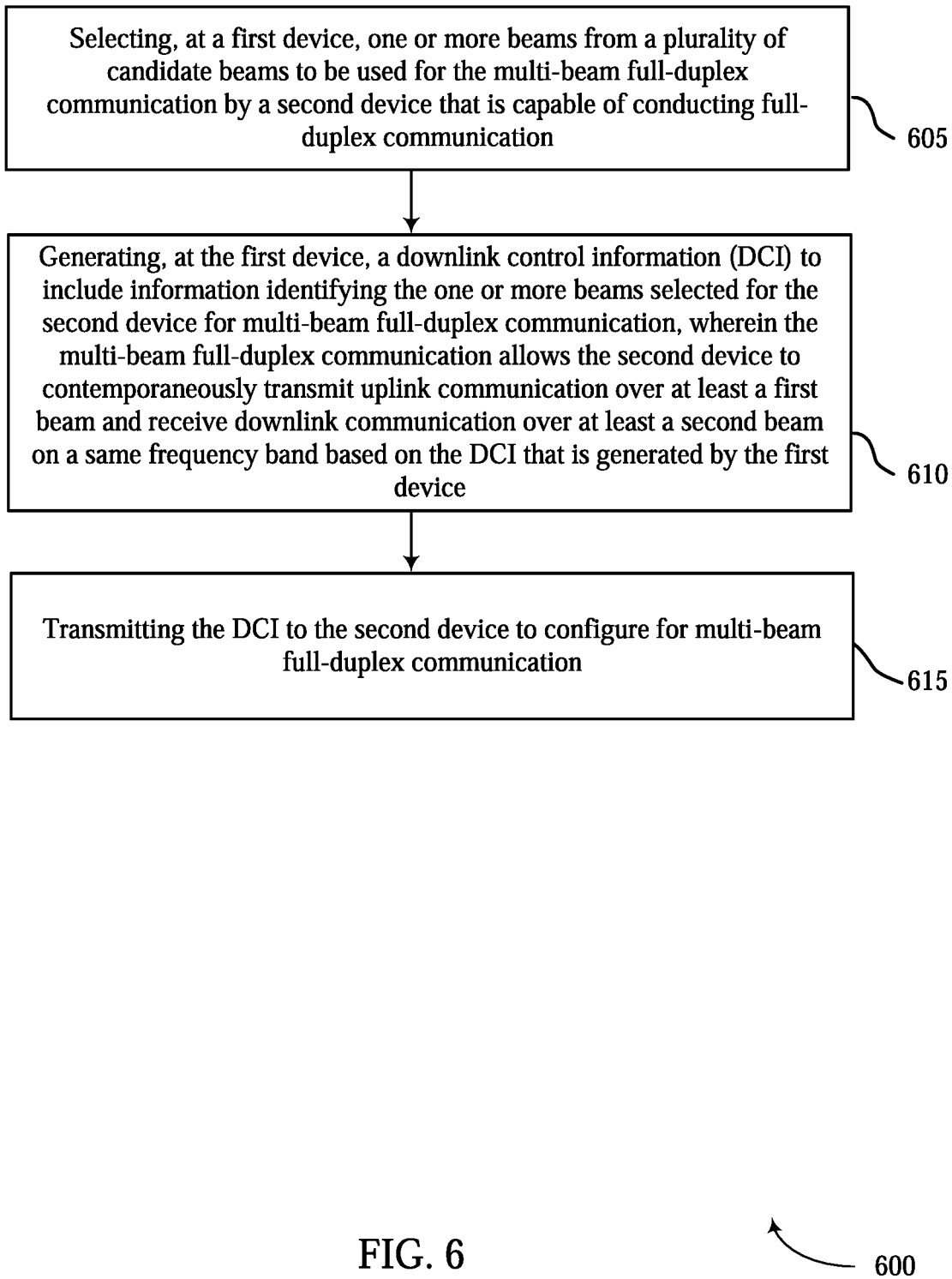
FIG. 6 is a flow diagram of an example of a method of wireless communication implemented by the base station or UE in accordance with aspects of the present disclosure.

Referring to FIG. 6, an example method 600 for wireless communications in accordance with aspects of the present disclosure may be performed by one or more base station 102 or a UE 104 in sidelink communication discussed with reference to FIGS. 1 and 2. Thus, in some examples, the "first device" referenced herein may be a base station 102 or UE 104, and a "second device" may be a UE 104. Additionally, although the method 600 is described below with respect to the elements of the base station 102 or a UE 104, other components may be used to implement one or more of the steps described herein.

At block 605, the method 600 may include selecting, at a first device, one or more beams from a plurality of candidate beams to be used for the multi-beam full-duplex communication by a second device that is capable of conducting full-duplex communication. Aspects of block 605 may be performed by the DCI generation component 550 and/or the modem 514 as described with reference to FIG. 5. Thus, the DCI generation component 550, modem 314, processor 312, and/or the UE 104 or one of its subcomponents may define the means for selecting, at a first device, one or more beams from a plurality of candidate beams to be used for the multi-beam full-duplex communication by a second device that is capable of conducting full-duplex communication.

At block 610, the method 600 may include generating, at the first device, a downlink control information (DCI) to include information identifying the one or more beams selected for the second device for multi-beam full-duplex communication, wherein the multi-beam full-duplex communication allows the second device to contemporaneously transmit uplink communication over at least a first beam and receive downlink communication over at least a second beam on a same frequency band based on the DCI that is generated by the first device. In some examples, the DCI includes a TCI state ID within the DCI. The TCI state ID may indicate each uplink and downlink beam that the first UE is configured to use for the multi-beam full-duplex communication with the base station or the second UE.

In some examples, generating the DCI to include information identifying the one or more beams selected for the second device for multi-beam full-duplex communication, may comprise mapping one or both of downlink TCI state and uplink TCI state to a TCI codepoint, and attaching the TCI codepoint to the DCI, wherein the TCI codepoint identifies at least a first beam for uplink communication and at least a second beam for downlink communication for the second device to use for the multi-beam full-duplex communication.

In other examples, generating the DCI may include mapping a downlink TCI to a first TCI codepoint that identifies a first set of beams to use for downlink communication, and mapping an uplink TCI state to a second TCI codepoint that identifies a second set of beams to use for downlink communication. The method may further include generating the DCI to include both the first TCI codepoint and the second TCI codepoint.

Additionally or alternatively, the DCI may further include information about repeated communication for a plurality of time slots. In such instances, each slot within the plurality of time slots may be configured for downlink communication, uplink communication, or full-duplex uplink and downlink contemporaneous communication. Aspects of block 615 may be performed by the DCI generation component 550 and/or the modem 514 described with reference to FIG. 5. Thus, the DCI generation component 550, modem 314, processor 312, and/or the UE 104 or one of its subcomponents may define the means for generating, at the first device, a downlink control information (DCI) to include information identifying the one or more beams selected for the second device for multi-beam full-duplex communication, wherein the multi-beam full-duplex communication allows the second device to contemporaneously transmit uplink communication over at least a first beam and receive downlink communication over at least a second beam on a same frequency band based on the DCI that is generated by the first device.

At block 620, the method 600 may include transmitting the DCI to the second device to configure for multi-beam full-duplex communication. In some examples, transmitting the DCI may include transmitting, from the first device to the second device, the DCI transmission from a first component carrier to facilitate the multi-beam full-duplex communication for the second device on a second component carrier.

Transmitting the DCI may also include activating, via the DCI transmitting to the second device, at least one SPS configuration and at least one configured grant (CG) for the first UE. In some aspects, the DCI further identifies at least a first beam for uplink communication and at least the second beam for downlink communication that the second device is configured to use for periodic communication using the multi-beam full-duplex communication. The method may further include deactivating, via the DCI transmitted to the second device, the at least one SPS configuration and the at least one CG for the first UE. In some aspects, activating the at least one SPE configuration and the at least one CG may include transmitting, from the first device to the second device, the DCI from a first component carrier to facilitate the multi-beam full-duplex communication for the second device on a second component carrier.

In some aspects, the method may also include transmitting, to the second device, a wakeup signal (WUS) from the first device in order to wake-up the second device from a sleep mode, wherein the WUS includes the DCI. The DCI may be included within the WUS determines whether an operation during a subsequent discontinuous reception (DRX) ON duration is for downlink communication, uplink communication, or a full-duplex uplink and downlink contemporaneous communication.

The method may also include transmitting, from the first device, a first stage-1 DCI to the second device over sidelink communication during a first time period, wherein the first stage-1 DCI includes a preliminary scheduling information to schedule full-duplex communication for uplink and downlink sidelink communication. The method may also include transmitting, from the first device, a second stage-2 DCI to the second device over the sidelink communication during a second time period. Additionally, the method may include receiving, from the second device, a third stage-2 DCI over the sidelink communication during the second time period, wherein the second stage-2 DCI and the third stage-2 DCI provide complete scheduling information to decode data in a PSSCH.

Additionally or alternatively, the method may include transmitting, from the first device, a first stage-1 DCI to the second device over sidelink communication during a first time period. The method may also include receiving, from the second device, a second stage-1 DCI over the sidelink communication during the first time period, wherein the first DCI and the second DCI include a preliminary scheduling information to schedule full-duplex communication for uplink and downlink sidelink communication. The method may also include transmitting, from the first device, a third stage-2 DCI to the second device over the sidelink communication during a second time period. The method may also include receiving, from the second device, a fourth stage-2 DCI over the sidelink communication during the second time period, wherein the third stage-2 DCI and the fourth stage-2 DCI provide complete scheduling information to decode data in a PSSCH.

In some aspects, the method may include configuring two separate search spaces for each of the first device and the second device to contemporaneously transmit and receive data over the PSSCH. Alternatively, the method may include configuring a single separate search space for each of the first device and the second device to contemporaneously transmit and receive data over the PSSCH.

Aspects of block 620 may be performed by transceiver 554 described with reference to FIG. 5. Thus, the transceiver 554, DCI generation component 550, modem 314, processor 312, and/or the UE 104 or one of its subcomponents may define the means for transmitting the DCI to the second device to configure for multi-beam full-duplex communication.

Figure 7:
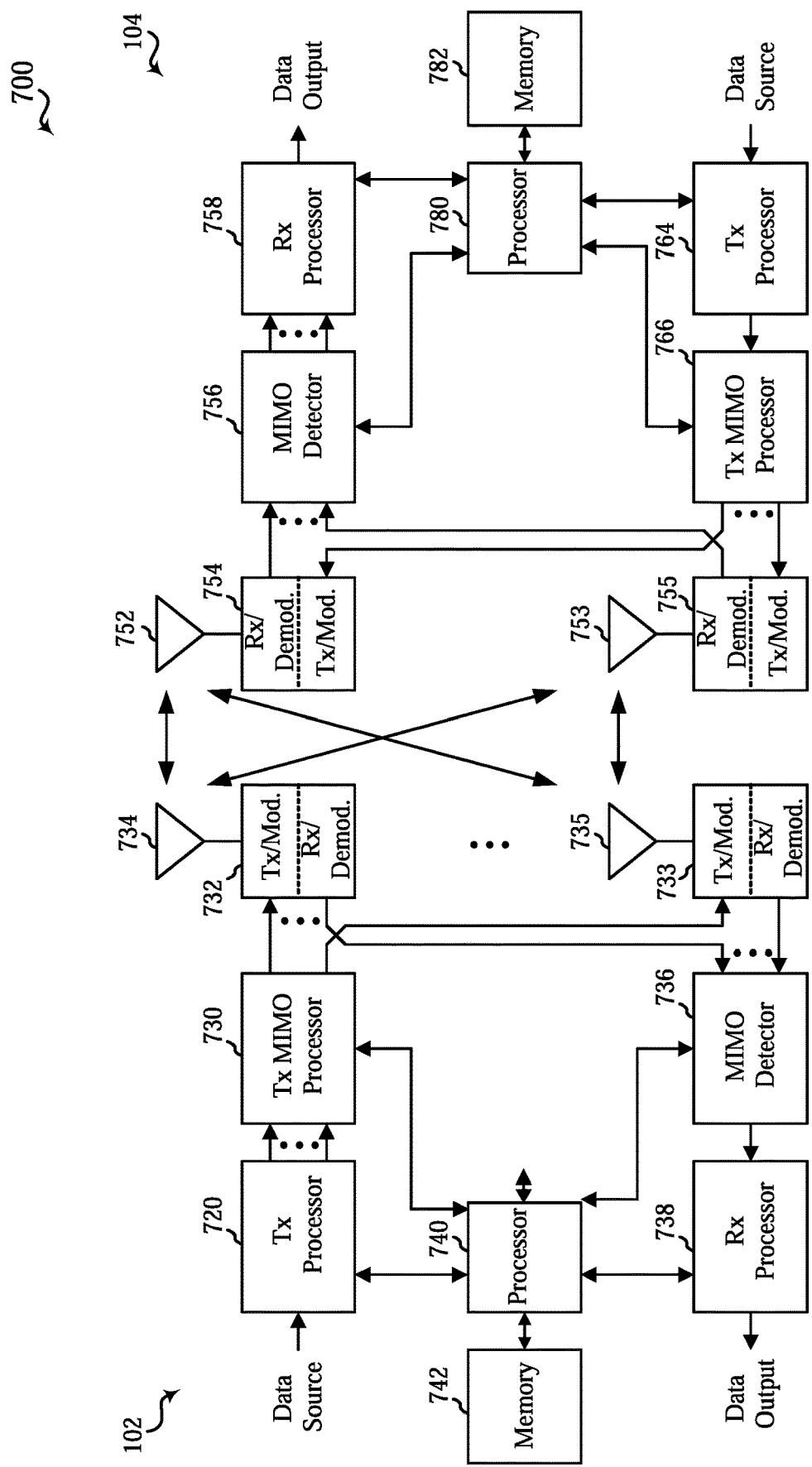
FIG. 7 is a block diagram of a MIMO communication system including a base station and a UE in accordance with aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a full-duplex communication management component 350 (see e.g., FIGS. 1 and 3). The processor 740 may in some cases execute stored instructions to instantiate a DCI generation component 550 (see e.g., FIGS. 1 and 5).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 700.

Some Further Example Clauses

Implementation examples are described in the following numbered clauses:

1. A method for wireless communications, comprising:
   receiving, at a first user equipment (UE), a downlink control information (DCI) to facilitate a multi-beam full-duplex communication;
   decoding the DCI to identify one or more beams from a plurality of candidate beams to be used for the multi-beam full-duplex communication by the first UE, wherein the multi-beam full-duplex communication comprises the first UE contemporaneously transmitting uplink communication over at least a first beam and receiving downlink communication over at least a second beam on a same frequency band;
   transmitting, during a first time slot, uplink data over a first set of antennas of the UE to a base station or a second UE on at least the first beam identified based on the decoding of the DCI; and receiving, during a first time slot, downlink data over a second set of antennas of the UE from the base station or the second UE on the at least the second beam identified based on the decoding of the DCI.

2. The method of clause 1, wherein decoding the DCI to identify the one or more beams from the plurality of candidate beams to be used for the multi-beam full-duplex communication by the first UE comprises:
   identifying a transmission configuration indication (TCI) state identification (ID) included in the DCI, wherein the TCI state ID indicates each uplink and downlink beam that the first UE is configured to use for the multi-beam full-duplex communication with the base station or the second UE.

3. The method of any clauses 1-2, wherein decoding the DCI to identify the one or more beams from the plurality of candidate beams to be used for the multi-beam full-duplex communication by the first UE comprises:
   identifying a transmission configuration indication (TCI) codepoint included in the DCI; and
   determining one or both of downlink TCI state and uplink TCI state that is mapped to the TCI codepoint in order to identify at least the first beam for uplink communication and at least the second beam for downlink communication that the first UE is configured to use for the multi-beam full-duplex communication with the base station or the second UE.

4. The method of any clauses 1-3, wherein decoding the DCI to identify the one or more beams from the plurality of candidate beams to be used for the multi-beam full-duplex communication by the first UE comprises:
   identifying a first transmission configuration indication (TCI) codepoint included in the DCI that is mapped to a downlink TCI state;

identifying a second TCI codepoint included in the DCI that is mapped to an uplink TCI state; and
determining the one or more beams from the plurality of candidate beams to be used for the multi-beam full-duplex communication by the first UE based on the first TCI codepoint and the second TCI codepoint.

5. The method of any clauses 1-4, wherein receiving the DCI to facilitate a multi-beam full-duplex communication, comprises:
receiving, at the first UE, the DCI from a first component carrier to facilitate the multi-beam full-duplex communication for the first UE on a second component carrier.

6. The method of any clauses 1-5, wherein receiving the DCI to facilitate a multi-beam full-duplex communication, comprises:
activating, via the DCI received at the UE, at least one semi-persistent scheduling (SPS) configuration and at least one configured grant (CG) for the first UE, and
wherein the DCI further identifies the at least the first beam for uplink communication and at least the second beam for downlink communication that the first UE is configured to use for periodic communication using the multi-beam full-duplex communication with the base station or the second UE.

7. The method of any clauses 1-6, further comprising:
deactivating, via the DCI received at the first UE, the at least one SPS configuration and the at least one CG for the first UE.

8. The method of any clauses 1-7, wherein the activating the at least one SPS configuration and the at least one CG for the first UE, comprises:
receiving, at the first UE, the DCI from a first component carrier to facilitate the multi-beam full-duplex communication for the first UE on a second component carrier; and
activating, via the DCI received from the first component carrier, the at least one SPS configuration and the at least one CG for the first UE on a second component carrier.

9. The method of any clauses 1-8, wherein decoding the DCI to identify the one or more beams from the plurality of candidate beams to be used for the multi-beam full-duplex communication by the first UE comprises:
receiving, at the first UE, a wakeup signal (WUS) from the base station in order to wake-up the first UE from a sleep mode, wherein the WUS includes the DCI;
decoding the DCI to determine whether an operation during a subsequent discontinuous reception (DRX) ON duration is for downlink communication, uplink communication, or a full-duplex uplink and downlink contemporaneous communication; and
identifying the one or more beams from the plurality of candidate beams to be used for the subsequent DRX ON duration for the full-duplex uplink and downlink contemporaneous communication based on decoding the DCI.

10. The method of any clauses 1-9, wherein receiving the DCI to facilitate a multi-beam full-duplex communication, comprises:
receiving, at the first UE, a first stage-1 DCI from the second UE over sidelink communication during a first time period, wherein the first stage-1 DCI includes a preliminary scheduling information to schedule full-duplex communication for uplink and downlink sidelink communication;
receiving, at the first UE, a second stage-2 DCI from the second UE over the sidelink communication during a second time period; and
transmitting, from the first UE to the second UE, a third stage-2 DCI over the sidelink communication during the second time period, wherein the second stage-2 DCI and the third stage-2 DCI provide complete scheduling information to decode data in a physical sidelink shared channel (PSSCH).

11. The method of any clauses 1-10, wherein receiving the DCI to facilitate a multi-beam full-duplex communication, comprises:
receiving, at the first UE, a first stage-1 DCI from the second UE over sidelink communication during a first time period;
transmitting, from the first UE to the second UE, a second stage-1 DCI over the sidelink communication during the first time period, wherein the first DCI and the second DCI include a preliminary scheduling information to schedule full-duplex communication for uplink and downlink sidelink communication;
receiving, at the first UE, a third stage-2 DCI from the second UE over the sidelink communication during a second time period; and
transmitting, from the first UE to the second UE, a fourth stage-2 DCI over the sidelink communication during the second time period, wherein the third stage-2 DCI and the fourth stage-2 DCI provide complete scheduling information to decode data in a physical sidelink shared channel (PSSCH).

12. The method of any clauses 1-11, further comprising:
configuring two separate search spaces for each of the first UE and the second UE to contemporaneously transmit and receive data over the physical sidelink shared channel (PSSCH).

13. The method of any clauses 1-12, further comprising:
configuring a single separate search space for each of the first UE and the second UE to contemporaneously transmit and receive data over the physical sidelink shared channel (PSSCH).

14. The method of any clauses 1-13, wherein the preliminary scheduling information includes one or more of PSSCH time and frequency resource assignment, modulation and coding scheme (MCS), MNRS pattern or port number, beta offset, priority, or stage-2 DCI format, and
wherein complete scheduling information include one or more of PSSCH hybrid automatic repeat request (HARM) ID, new data indicator (NDI), RV, channel state information (CSI) request, or source/destination node ID.

15. The method of any clauses 1-14, wherein the first set of antennas and the second set of antennas of the UE are different.

16. The method of any clauses 1-15, wherein the first set of antennas and the second set of antennas of the UE are same.

17. An apparatus for wireless communications, comprising:
a memory configured to store instructions;
a processor communicatively coupled with the memory, the processor configured to execute the instructions to:

receive, at a first user equipment (UE), a downlink control information (DCI) to facilitate a multi-beam full-duplex communication;

decode the DCI to identify one or more beams from a plurality of candidate beams to be used for the multi-beam full-duplex communication by the first UE, wherein the multi-beam full-duplex communication comprises the first UE contemporaneously transmitting uplink communication over at least a first beam and receiving downlink communication over at least a second beam on a same frequency band;

transmit, during a first time slot, uplink data over a first set of antennas of the first UE to a base station or a second UE on at least the first beam identified based on the decoding of the DCI; and receive, during a first time slot, downlink data over a second set of antennas of the first UE from the base station or the second UE on the at least the second beam identified based on the decoding of the DCI.

18. The apparatus of clause 17, wherein the instructions to decode the DCI to identify the one or more beams from the plurality of candidate beams to be used for the multi-beam full-duplex communication by the first UE are further executable by the processor to:

identify a transmission configuration indication (TCI) state identification (ID) included in the DCI, wherein the TCI state ID indicates each uplink and downlink beam that the first UE is configured to use for the multi-beam full-duplex communication with the base station or the second UE.

19. The apparatus of clauses 17 or 18, wherein the instructions to decode the DCI to identify the one or more beams from the plurality of candidate beams to be used for the multi-beam full-duplex communication by the first UE are further executable by the processor to:

identify a transmission configuration indication (TCI) codepoint included in the DCI; and determine one or both of downlink TCI state and uplink TCI state that is mapped to the TCI codepoint in order to identify at least the first beam for uplink communication and at least the second beam for downlink communication that the first UE is configured to use for the multi-beam full-duplex communication with the base station or the second UE.

20. The apparatus of any clauses 17-19, wherein the instructions to decode the DCI to identify the one or more beams from the plurality of candidate beams to be used for the multi-beam full-duplex communication by the first UE are further executable by the processor to:

Identify a first transmission configuration indication (TCI) codepoint included in the DCI that is mapped to a downlink TCI state;

identify a second TCI codepoint included in the DCI that is mapped to an uplink TCI state; and determine the one or more beams from the plurality of candidate beams to be used for the multi-beam full-duplex communication by the first UE based on the first TCI codepoint and the second TCI codepoint.

21. The apparatus of any clauses 17-20, wherein the instructions to receive the DCI to facilitate a multi-beam full-duplex communication, are further executable by the processor to:

receive, at the first UE, the DCI from a first component carrier to facilitate the multi-beam full-duplex communication for the first UE on a second component carrier.

22. The apparatus of any clauses 17-21, wherein the instructions to receive the DCI to facilitate a multi-beam full-duplex communication, are further executable by the processor to:

activate, via the DCI received at the UE, at least one semi-persistent scheduling (SPS) configuration and at least one configured grant (CG) for the first UE, and wherein the DCI further identifies the at least the first beam for uplink communication and at least the second beam for downlink communication that the first UE is configured to use for periodic communication using the multi-beam full-duplex communication with the base station or the second UE.

23. The apparatus of any clauses 17-22, wherein the processor is further configured to execute instructions to:

deactivate, via the DCI received at the first UE, the at least one SPS configuration and the at least one CG for the first UE.

24. The apparatus of any clauses 17-23, wherein the instructions to activate the at least one SPS configuration and the at least one CG for the first UE are further executable by the processor to:

receive, at the first UE, the DCI from a first component carrier to facilitate the multi-beam full-duplex communication for the first UE on a second component carrier; and activate, via the DCI received from the first component carrier, the at least one SPS configuration and the at least one CG for the first UE on a second component carrier.

25. The apparatus of any clauses 17-24, wherein the instructions to decode the DCI to identify the one or more beams from the plurality of candidate beams to be used for the multi-beam full-duplex communication by the first UE are further executable by the processor to:

determine that the DCI includes information about repeated communication for a plurality of time slots, wherein each slot within the plurality of time slots is configured for downlink communication, uplink communication, or full-duplex uplink and downlink contemporaneous communication; and identify the one or more beams from the plurality of candidate beams to be used for the repeated communication during the plurality of time slots for the downlink communication, the uplink communication, or the full-duplex uplink and downlink contemporaneous communication.

26. The apparatus of any clauses 17-25, wherein the instructions to decode the DCI to identify the one or more beams from the plurality of candidate beams to be used for the multi-beam full-duplex communication by the first UE are further executable by the processor to:

receive, at the first UE, a wakeup signal (WUS) from the base station in order to wake-up the first UE from a sleep mode, wherein the WUS includes the DCI;

decode the DCI to determine whether an operation during a subsequent discontinuous reception (DRX) ON duration is for downlink communication, uplink communication, or a full-duplex uplink and downlink contemporaneous communication; and identify the one or more beams from the plurality of candidate beams to be used for the subsequent DRX ON duration for the full-duplex uplink and downlink contemporaneous communication based on decoding the DCI.

27. The apparatus of any clauses 17-26, wherein the instructions to receive the DCI to facilitate a multi-beam full-duplex communication, are further executable by the processor to:
receive, at the first UE, a first stage-1 DCI from the second UE over sidelink communication during a first time period, wherein the first stage-1 DCI includes a preliminary scheduling information to schedule full-duplex communication for uplink and downlink sidelink communication;
receive, at the first UE, a second stage-2 DCI from the second UE over the sidelink communication during a second time period; and
transmit, from the first UE to the second UE, a third stage-2 DCI over the sidelink communication during the second time period, wherein the second stage-2 DCI and the third stage-2 DCI provide complete scheduling information to decode data in a physical sidelink shared channel (PSSCH).

28. The apparatus of any clauses 17-27, wherein the instructions to receive the DCI to facilitate a multi-beam full-duplex communication, are further executable by the processor to:
receive, at the first UE, a first stage-1 DCI from the second UE over sidelink communication during a first time period;
transmit, from the first UE to the second UE, a second stage-1 DCI over the sidelink communication during the first time period, wherein the first DCI and the second DCI include a preliminary scheduling information to schedule full-duplex communication for uplink and downlink sidelink communication;
receive, at the first UE, a third stage-2 DCI from the second UE over the sidelink communication during a second time period; and
transmit, from the first UE to the second UE, a fourth stage-2 DCI over the sidelink communication during the second time period, wherein the third stage-2 DCI and the fourth stage-2 DCI provide complete scheduling information to decode data in a physical sidelink shared channel (PSSCH).

29. A non-transitory computer readable medium storing instructions, executable by a processor, for wireless communications, comprising instructions for:
receiving, at a first user equipment (UE), a downlink control information (DCI) to facilitate a multi-beam full-duplex communication;
decoding the DCI to identify one or more beams from a plurality of candidate beams to be used for the multi-beam full-duplex communication by the first UE, wherein the multi-beam full-duplex communication comprises the first UE contemporaneously transmitting uplink communication over at least a first beam and receiving downlink communication over at least a second beam on a same frequency band;
transmitting, during a first time slot, uplink data over a first set of antennas of the first UE to a base station or a second UE on at least the first beam identified based on the decoding of the DCI; and
receiving, during a first time slot, downlink data over a second set of antennas of the first UE from the base station or the second UE on the at least the second beam identified based on the decoding of the DCI.

30. An apparatus for wireless communications, comprising:
means for receiving, at a first user equipment (UE), a downlink control information (DCI) to facilitate a multi-beam full-duplex communication;
means for decoding the DCI to identify one or more beams from a plurality of candidate beams to be used for the multi-beam full-duplex communication by the first UE, wherein the multi-beam full-duplex communication comprises the first UE contemporaneously transmitting uplink communication over at least a first beam and receiving downlink communication over at least a second beam on a same frequency band;
means for transmitting, during a first time slot, uplink data over a first set of antennas of the first UE to a base station or a second UE on at least the first beam identified based on the decoding of the DCI; and
means for receiving, during a first time slot, downlink data over a second set of antennas of the first UE from the base station or the second UE on the at least the second beam identified based on the decoding of the DCI.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems are also presented with reference to various apparatus and methods. These apparatus and methods are described in the detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout the disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
   receiving, at a first user equipment (UE), a downlink control information (DCI) to facilitate a multi-beam full-duplex communication in sidelink with a second UE;
   configuring a single separate search space for each of the first UE and the second UE to contemporaneously transmit and receive data over a physical sidelink shared channel (PSSCH);
   decoding the DCI to identify one or more beams from a plurality of candidate beams to be used for the multi-beam full-duplex communication by the first UE, wherein the multi-beam full-duplex communication comprises the first UE contemporaneously transmitting uplink communication over at least a first beam and receiving downlink communication over at least a second beam on a same frequency band;
   transmitting, during a first time slot, uplink data over a first set of antennas of the first UE to the second UE on at least the first beam identified based on the decoding of the DCI; and
   receiving, during the first time slot, downlink data over a second set of antennas of the first UE from the second UE on the at least the second beam identified based on the decoding of the DCI.

2. The method of claim 1, wherein decoding the DCI to identify the one or more beams from the plurality of candidate beams to be used for the multi-beam full-duplex communication by the first UE comprises:
   identifying a transmission configuration indication (TCI) state identification (ID) included in the DCI, wherein the TCI state ID indicates each uplink and downlink beam that the first UE is configured to use for the multi-beam full-duplex communication with the second UE.

3. The method of claim 1, wherein decoding the DCI to identify the one or more beams from the plurality of candidate beams to be used for the multi-beam full-duplex communication by the first UE comprises:
   identifying a transmission configuration indication (TCI) codepoint included in the DCI; and
   determining one or both of downlink TCI state and uplink TCI state that is mapped to the TCI codepoint in order to identify at least the first beam for uplink communication and at least the second beam for downlink communication that the first UE is configured to use for the multi-beam full-duplex communication with the second UE.

4. The method of claim 1, wherein decoding the DCI to identify the one or more beams from the plurality of candidate beams to be used for the multi-beam full-duplex communication by the first UE comprises:
   identifying a first transmission configuration indication (TCI) codepoint included in the DCI that is mapped to a downlink TCI state;
   identifying a second TCI codepoint included in the DCI that is mapped to an uplink TCI state; and
   determining the one or more beams from the plurality of candidate beams to be used for the multi-beam full-duplex communication by the first UE based on the first TCI codepoint and the second TCI codepoint.

5. The method of claim 1, wherein receiving the DCI to facilitate a multi-beam full-duplex communication, comprises:
   receiving, at the first UE, the DCI from a first component carrier to facilitate the multi-beam full-duplex communication for the first UE on a second component carrier.

6. The method of claim 1, wherein:
   receiving the DCI to facilitate a multi-beam full-duplex communication, comprises activating, via the DCI received at the UE, at least one semi-persistent scheduling (SPS) configuration and at least one configured grant (CG) for the first UE, and
   the DCI further identifies the at least the first beam for uplink communication and at least the second beam for downlink communication that the first UE is configured to use for periodic communication using the multi-beam full-duplex communication with the second UE.

7. The method of claim 6, further comprising:
   deactivating, via the DCI received at the first UE, the a least one SPS configuration and the at least one CG for the first UE.

8. The method of claim 6, wherein the activating the at least one SPS configuration and the at least one CG for the first UE, comprises:
   receiving, at the first UE, the DCI from a first component carrier to facilitate the multi-beam full-duplex communication for the first UE on a second component carrier; and
   activating, via the DCI received from the first component carrier, the at least one SPS configuration and the at least one CG for the first UE on a second component carrier.

9. The method of claim 1, wherein decoding the DCI to identify the one or more beams from the plurality of candidate beams to be used for the multi-beam full-duplex communication by the first UE comprises:
   receiving, at the first UE, a wakeup signal (WUS) from a base station in order to wake-up the first UE from a sleep mode, wherein the WUS includes the DCI;
   decoding the DCI to determine whether an operation during a subsequent discontinuous reception (DRX) ON duration is for downlink communication, uplink communication, or a full-duplex uplink and downlink contemporaneous communication; and
   identifying the one or more beams from the plurality of candidate beams to be used for the subsequent DRX ON duration for the full-duplex uplink and downlink contemporaneous communication based on decoding the DCI.

10. The method of claim 1, wherein receiving the DCI to facilitate a multi-beam full-duplex communication, comprises:
    receiving, at the first UE, a first stage-1 DCI from the second UE over sidelink communication during a first time period, wherein the first stage-1 DCI includes a preliminary scheduling information to schedule full-duplex communication for uplink and downlink sidelink communication;
    receiving, at the first UE, a second stage-2 DCI from the second UE over the sidelink communication during a second time period; and
    transmitting, from the first UE to the second UE, a third stage-2 DCI over the sidelink communication during the second time period, wherein the second stage-2 DCI and the third stage-2 DCI provide complete scheduling information to decode data in a physical sidelink shared channel (PSSCH).

11. The method of claim 1, wherein receiving the DCI to facilitate a multi-beam full-duplex communication, comprises:
  receiving, at the first UE, a first stage-1 DCI from the second UE over sidelink communication during a first time period;
  transmitting, from the first UE to the second UE, a second stage-1 DCI over the sidelink communication during the first time period, wherein the first DCI and the second DCI include a preliminary scheduling information to schedule full-duplex communication for uplink and downlink sidelink communication;
  receiving, at the first UE, a third stage-2 DCI from the second UE over the sidelink communication during a second time period; and
  transmitting, from the first UE to the second UE, a fourth stage-2 DCI over the sidelink communication during the second time period, wherein the third stage-2 DCI and the fourth stage-2 DCI provide complete scheduling information to decode data in a physical sidelink shared channel (PSSCH).

12. The method of claim 11, further comprising:
configuring two separate search spaces for each of the first UE and the second UE to contemporaneously transmit and receive data over the physical sidelink shared channel (PSSCH).

13. The method of claim 11, wherein:
the preliminary scheduling information includes one or more of PSSCH time and frequency resource assignment, modulation and coding scheme (MCS), MNRS pattern or port number, beta offset, priority, or stage-2 DCI format, and
complete scheduling information include one or more of PSSCH hybrid automatic repeat request (HARQ) ID, new data indicator (NDI), RV, channel state information (CSI) request, or source/destination node ID.

14. The method of claim 1, wherein the first set of antennas and the second set of antennas of the UE are different.

15. The method of claim 1, wherein the first set of antennas and the second set of antennas of the UE are same.

16. An apparatus for wireless communications, comprising:
  a memory configured to store instructions;
  a processor communicatively coupled with the memory, the processor configured to execute the instructions to:
  receive, at the apparatus, a downlink control information (DCI) to facilitate a multi-beam full-duplex communication;
  configure a single separate search space for each of the apparatus and a second UE to contemporaneously transmit and receive data over a physical sidelink shared channel (PSSCH);
  decode the DCI to identify one or more beams from a plurality of candidate beams to be used for the multi-beam full-duplex communication by the apparatus, wherein the multi-beam full-duplex communication comprises the apparatus contemporaneously transmitting uplink communication over at least a first beam and receiving downlink communication over at least a second beam on a same frequency band;
  transmit, during a first time slot, uplink data over a first set of antennas of the apparatus to the second UE on at least the first beam identified based on the decoding of the DCI; and
  receive, during the first time slot, downlink data over a second set of antennas of the apparatus from the second UE on the at least the second beam identified based on the decoding of the DCI.

17. The apparatus of claim 16, wherein the instructions to decode the DCI to identify the one or more beams from the plurality of candidate beams to be used for the multi-beam full-duplex communication by the apparatus are further executable by the processor to:
  identify a transmission configuration indication (TCI) state identification (ID) included in the DCI, wherein the TCI state ID indicates each uplink and downlink beam that the apparatus is configured to use for the multi-beam full-duplex communication with the second UE.

18. The apparatus of claim 16, wherein the instructions to decode the DCI to identify the one or more beams from the plurality of candidate beams to be used for the multi-beam full-duplex communication by the apparatus are further executable by the processor to:
  identify a transmission configuration indication (TCI) codepoint included in the DCI; and
  determine one or both of downlink TCI state and uplink TCI state that is mapped to the TCI codepoint in order to identify at least the first beam for uplink communication and at least the second beam for downlink communication that the apparatus is configured to use for the multi-beam full-duplex communication with the second UE.

19. The apparatus of claim 16, wherein the instructions to decode the DCI to identify the one or more beams from the plurality of candidate beams to be used for the multi-beam full-duplex communication by the apparatus are further executable by the processor to:
  identify a first transmission configuration indication (TCI) codepoint included in the DCI that is mapped to a downlink TCI state;
  identify a second TCI codepoint included in the DCI that is mapped to an uplink TCI state; and
  determine the one or more beams from the plurality of candidate beams to be used for the multi-beam full-duplex communication by the apparatus based on the first TCI codepoint and the second TCI codepoint.

20. The apparatus of claim 16, wherein the instructions to receive the DCI to facilitate a multi-beam full-duplex communication, are further executable by the processor to:
  receive, at the apparatus, the DCI from a first component carrier to facilitate the multi-beam full-duplex communication for the apparatus on a second component carrier.

21. The apparatus of claim 16, wherein:
the instructions to receive the DCI to facilitate a multi-beam full-duplex communication, are further executable by the processor to activate, via the DCI received at the apparatus, at least one semi-persistent scheduling (SPS) configuration and at least one configured grant (CG) for the apparatus, and
the DCI further identifies the at least the first beam for uplink communication and at least the second beam for downlink communication that the apparatus is configured to use for periodic communication using the multi-beam full-duplex communication with the second UE.

22. The apparatus of claim 21, wherein the processor is further configured to execute instructions to:

deactivate, via the DCI received at the apparatus, the at least one SPS configuration and the at least one CG for the apparatus.

23. The apparatus of claim 22, wherein the instructions to activate the at least one SPS configuration and the at least one CG for the apparatus are further executable by the processor to:
receive, at the apparatus, the DCI from a first component carrier to facilitate the multi-beam full-duplex communication for the apparatus on a second component carrier; and
activate, via the DCI received from the first component carrier, the at least one SPS configuration and the at least one CG for the apparatus on a second component carrier.

24. The apparatus of claim 16, wherein the instructions to decode the DCI to identify the one or more beams from the plurality of candidate beams to be used for the multi-beam full-duplex communication by the apparatus are further executable by the processor to:
determine that the DCI includes information about repeated communication for a plurality of time slots, wherein each slot within the plurality of time slots is configured for downlink communication, uplink communication, or full-duplex uplink and downlink contemporaneous communication; and
identify the one or more beams from the plurality of candidate beams to be used for the repeated communication during the plurality of time slots for the downlink communication, the uplink communication, or the full-duplex uplink and downlink contemporaneous communication.

25. The apparatus of claim 16, wherein the instructions to decode the DCI to identify the one or more beams from the plurality of candidate beams to be used for the multi-beam full-duplex communication by the apparatus are further executable by the processor to:
receive, at the apparatus, a wakeup signal (WUS) from a base station in order to wake-up the apparatus from a sleep mode, wherein the WUS includes the DCI;
decode the DCI to determine whether an operation during a subsequent discontinuous reception (DRX) ON duration is for downlink communication, uplink communication, or a full-duplex uplink and downlink contemporaneous communication; and
identify the one or more beams from the plurality of candidate beams to be used for the subsequent DRX ON duration for the full-duplex uplink and downlink contemporaneous communication based on decoding the DCI.

26. The apparatus of claim 16, wherein the instructions to receive the DCI to facilitate a multi-beam full-duplex communication, are further executable by the processor to:
receive, at the apparatus, a first stage-1 DCI from the second UE over sidelink communication during a first time period, wherein the first stage-1 DCI includes a preliminary scheduling information to schedule full-duplex communication for uplink and downlink sidelink communication;
receive, at the apparatus, a second stage-2 DCI from the second UE over the sidelink communication during a second time period; and
transmit, from the apparatus to the second UE, a third stage-2 DCI over the sidelink communication during the second time period, wherein the second stage-2 DCI and the third stage-2 DCI provide complete scheduling information to decode data in a physical sidelink shared channel (PSSCH).

27. The apparatus of claim 16, wherein the instructions to receive the DCI to facilitate a multi-beam full-duplex communication, are further executable by the processor to:
receive, at the apparatus, a first stage-1 DCI from the second UE over sidelink communication during a first time period;
transmit, from the apparatus to the second UE, a second stage-1 DCI over the sidelink communication during the first time period, wherein the first DCI and the second DCI include a preliminary scheduling information to schedule full-duplex communication for uplink and downlink sidelink communication;
receive, at the apparatus, a third stage-2 DCI from the second UE over the sidelink communication during a second time period; and
transmit, from the apparatus to the second UE, a fourth stage-2 DCI over the sidelink communication during the second time period, wherein the third stage-2 DCI and the fourth stage-2 DCI provide complete scheduling information to decode data in a physical sidelink shared channel (PSSCH).

28. A non-transitory computer readable medium storing instructions, executable by a processor, for wireless communications, comprising instructions for:
receiving, at a first user equipment (UE), a downlink control information (DCI) to facilitate a multi-beam full-duplex communication;
configuring a single separate search space for each of the first and a second UE to contemporaneously transmit and receive data over a physical sidelink shared channel (PSSCH);
decoding the DCI to identify one or more beams from a plurality of candidate beams to be used for the multi-beam full-duplex communication by the first UE, wherein the multi-beam full-duplex communication comprises the first UE contemporaneously transmitting uplink communication over at least a first beam and receiving downlink communication over at least a second beam on a same frequency band;
transmitting, during a first time slot, uplink data over a first set of antennas of the first UE to the second UE on at least the first beam identified based on the decoding of the DCI; and
receiving, during the first time slot, downlink data over a second set of antennas of the first UE from the second UE on the at least the second beam identified based on the decoding of the DCI.

29. An apparatus for wireless communications, comprising:
means for receiving, at a first user equipment (UE), a downlink control information (DCI) to facilitate a multi-beam full-duplex communication;
means for configuring a single separate search space for each of the first UE and a second UE to contemporaneously transmit and receive data over a physical sidelink shared channel (PSSCH);
means for decoding the DCI to identify one or more beams from a plurality of candidate beams to be used for the multi-beam full-duplex communication by the first UE, wherein the multi-beam full-duplex communication comprises the first UE contemporaneously transmitting uplink communication over at least a first beam and receiving downlink communication over at least a second beam on a same frequency band;

means for transmitting, during a first time slot, uplink data over a first set of antennas of the first UE to the second UE on at least the first beam identified based on the decoding of the DCI; and means for receiving, during the first time slot, downlink data over a second set of antennas of the first UE from the second UE on the at least the second beam identified based on the decoding of the DCI.

* * * * *